(12) United States Patent
Takeda et al.

(10) Patent No.: US 11,632,067 B2
(45) Date of Patent: Apr. 18, 2023

(54) SPEED ESTIMATING DEVICE FOR AC MOTOR, DRIVING DEVICE FOR AC MOTOR, REFRIGERANT COMPRESSOR, AND REFRIGERATION CYCLE APPARATUS

(71) Applicant: Mitsubishi Electric Corporation, Tokyo (JP)

(72) Inventors: Yuriko Takeda, Tokyo (JP); Kenji Takahashi, Tokyo (JP); Shinya Toyodome, Tokyo (JP); Mitsuo Kashima, Tokyo (JP); Tomohiro Kutsuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 62 days.

(21) Appl. No.: 17/429,363

(22) PCT Filed: Mar. 22, 2019

(86) PCT No.: PCT/JP2019/012213
§ 371 (c)(1),
(2) Date: Aug. 9, 2021

(87) PCT Pub. No.: WO2020/194401
PCT Pub. Date: Oct. 1, 2020

(65) Prior Publication Data
US 2022/0149764 A1 May 12, 2022

(51) Int. Cl.
*H02P 21/18* (2016.01)
*H02P 21/24* (2016.01)
(Continued)

(52) U.S. Cl.
CPC ............ *H02P 21/18* (2016.02); *F25B 49/022* (2013.01); *H02P 21/0017* (2013.01);
(Continued)

(58) Field of Classification Search
CPC ...... H02P 21/18; H02P 21/0017; H02P 21/05; H02P 21/13; H02P 21/24; H02P 21/141; H02P 6/34; F25B 49/022
(Continued)

(56) References Cited

U.S. PATENT DOCUMENTS 9,160,271 B2 * 10/2015 Yamasaki .............. H02P 21/05
9,543,875 B2 1/2017 Yamazaki et al.
(Continued)

FOREIGN PATENT DOCUMENTS

JP 2015-207138 A 11/2015
JP 2016-032364 A 3/2016
(Continued)

OTHER PUBLICATIONS

International Search Report and Written Opinion dated Jun. 18, 2019, received for PCT Application PCT/JP2019/012213, Filed on Mar. 22, 2019, 6 pages including English Translation.
Office Action dated Mar. 22, 2022, in corresponding Indian patent Application No. 202127036839, 5 pages.

*Primary Examiner* — David Luo
(74) *Attorney, Agent, or Firm* — Xsensus LLP

(57) ABSTRACT

A speed estimating device for an AC motor includes: a model deviation computing unit computing a model deviation based on a voltage, a current, and an estimated angular velocity of the AC motor; a first angular velocity estimating unit computing a first estimated angular velocity based on the model deviation; a second angular velocity estimating unit computing a second estimated angular velocity differing from the first estimated angular velocity in frequency, based on the model deviation; a compensation phase computing unit computing a compensation phase based on a disturbance frequency; and an estimated angular velocity calculator computing an estimated angular velocity of the AC motor based on the first estimated angular velocity and the
(Continued)

second estimated angular velocity. Either one of the first estimated angular velocity and the second estimated angular velocity is computed based on the compensation phase.

11 Claims, 17 Drawing Sheets

(51) Int. Cl.
*F25B 49/02* (2006.01)
*H02P 21/00* (2016.01)
*H02P 21/05* (2006.01)
*H02P 21/13* (2006.01)

(52) U.S. Cl.
CPC .............. *H02P 21/05* (2013.01); *H02P 21/13* (2013.01); *H02P 21/24* (2016.02)

(58) Field of Classification Search
USPC .............................. 318/400.02, 400.01, 700
See application file for complete search history.

(56) References Cited

U.S. PATENT DOCUMENTS

| 2016/0036364 | A1 | 2/2016 | Yamazaki et al. |
| 2019/0145668 | A1 | 5/2019 | Takahashi et al. |
| 2020/0028454 | A1 | 1/2020 | Kinomura |

FOREIGN PATENT DOCUMENTS

| JP | 6222417 B1 | 11/2017 |
| WO | 2017/212794 A1 | 12/2017 |

* cited by examiner

FIG.9
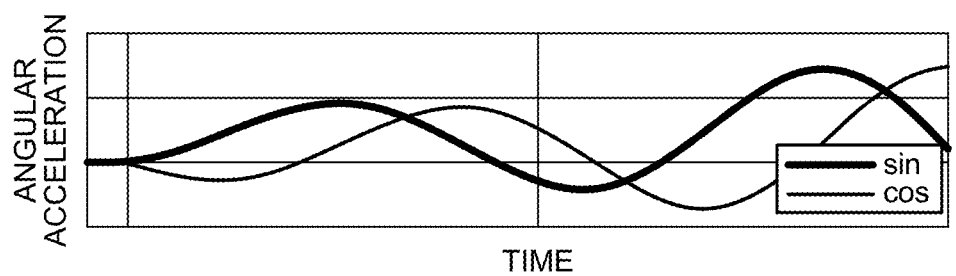
WITHOUT PHASE COMPENSATION
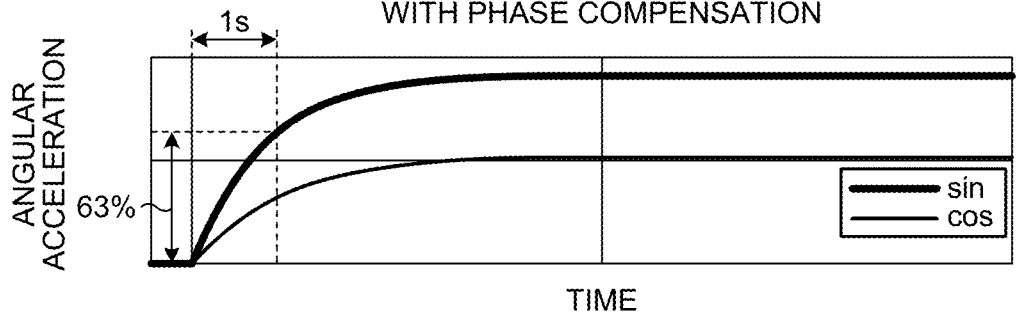
WITH PHASE COMPENSATION
FIG.10
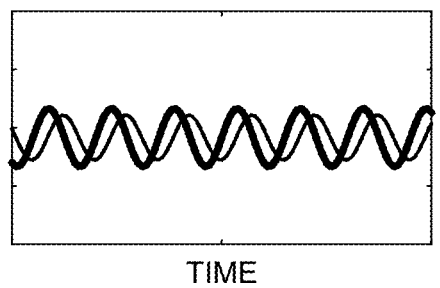
TIME
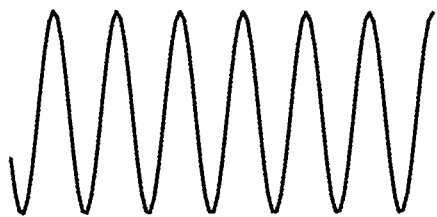

SPEED ESTIMATING DEVICE FOR AC MOTOR, DRIVING DEVICE FOR AC MOTOR, REFRIGERANT COMPRESSOR, AND REFRIGERATION CYCLE APPARATUS

CROSS-REFERENCE TO RELATED APPLICATION

The present application is based on PCT filing PCT/JP2019/012213, filed Mar. 22, 2019, the entire contents of which are incorporated herein by reference.

FIELD

The present invention relates to a speed estimating device for an alternating-current (AC) motor which estimates the velocity of an AC motor such as an induction machine or a synchronous machine, a driving device for an AC motor, a refrigerant compressor, and a refrigeration cycle apparatus.

BACKGROUND

In control of an AC motor, when load torque or torque generated by the AC motor has pulsation, some pulsation also occurs in the rotational speed of the AC motor. The occurrence of pulsation in the rotational speed of the AC motor may cause vibration in an apparatus on which the AC motor is installed, which may be problematic in occurrence of noise, mechanical strength, or the like. In response to these problems, control for reducing torque pulsation and speed pulsation has been considered.

For example, Patent Literature 1 listed below teaches a technique for achieving control for reducing torque pulsation and speed pulsation by a sensorless approach without using a position sensor or a velocity sensor in order to reduce cost or to allow application to an apparatus on which it is difficult to install a sensor. According to Patent Literature 1, a torque compensation value is obtained on the basis of a speed ripple component extracted from a difference between a command angular frequency and a speed feedback angular frequency. The fluctuation in speed of the AC motor is thus reduced or suppressed without any map of correction amounts.

CITATION LIST

Patent Literature

Patent Literature 1: Japanese Patent No. 6222417

SUMMARY

Technical Problem

In position-sensorless control, an upper limit of speed estimation response in conventional control systems is several hundreds [rad/s], and so a response to high-frequency pulsation is insufficient, and it is difficult to accurately estimate a pulsation. In addition, in Patent Literature 1, because a vibration reducing unit is configured to use an estimated speed, the performance of the vibration reducing unit depends on a response in the speed estimation, and is thus considered to be insufficient in a high-frequency range.

The present invention has been made in view of the above circumstances, and an object thereof is to provide a speed estimating device for an AC motor, which is capable of further increasing the accuracy of speed estimation at high frequency in sensorless control of an AC motor.

Solution to Problem

In order to solve the aforementioned problems and achieve the object, the present invention provides a speed estimating device for an AC motor, the speed estimating device comprising: a model deviation computing unit to compute a model deviation on the basis of a voltage, a current, and an estimated angular velocity of the AC motor; a first angular velocity estimating unit to compute a first estimated angular velocity on the basis of the model deviation; a second angular velocity estimating unit to compute a second estimated angular velocity on the basis of the model deviation, the second estimated angular velocity differing from the first estimated angular velocity in frequency; a compensation phase computing unit to compute a compensation phase on the basis of a disturbance frequency; and an estimated angular velocity calculator to compute an estimated angular velocity of the AC motor on the basis of the first and second estimated angular velocities, wherein either one of the first and second estimated angular velocities is computed on the basis of the compensation phase.

Advantageous Effects of Invention

The speed estimating device for an AC motor according to the present invention produces an advantageous effect that it is capable of further increasing the accuracy of speed estimation at high frequency in sensorless control on an AC motor.

BRIEF DESCRIPTION OF DRAWINGS

FIG. 9 is a first graph made available for explaining the effect of the speed estimating device according to the first embodiment.

FIG. 10 is a second graph made available for explaining the effect of the speed estimating device according to the first embodiment.

DESCRIPTION OF EMBODIMENTS

A speed estimating device for an AC motor, a driving device for an AC motor, a refrigerant compressor, and a refrigeration cycle apparatus according to certain embodiments of the present invention will be described in detail below with reference to the drawings. Note that the present invention is not limited by the embodiments described below. Hereinafter, the speed estimating device for an AC motor will be simply referred to as a "speed estimating device" as appropriate. In addition, the driving device for an AC motor will be simply referred to as a "driving device" as appropriate.

First Embodiment

Figure 1:
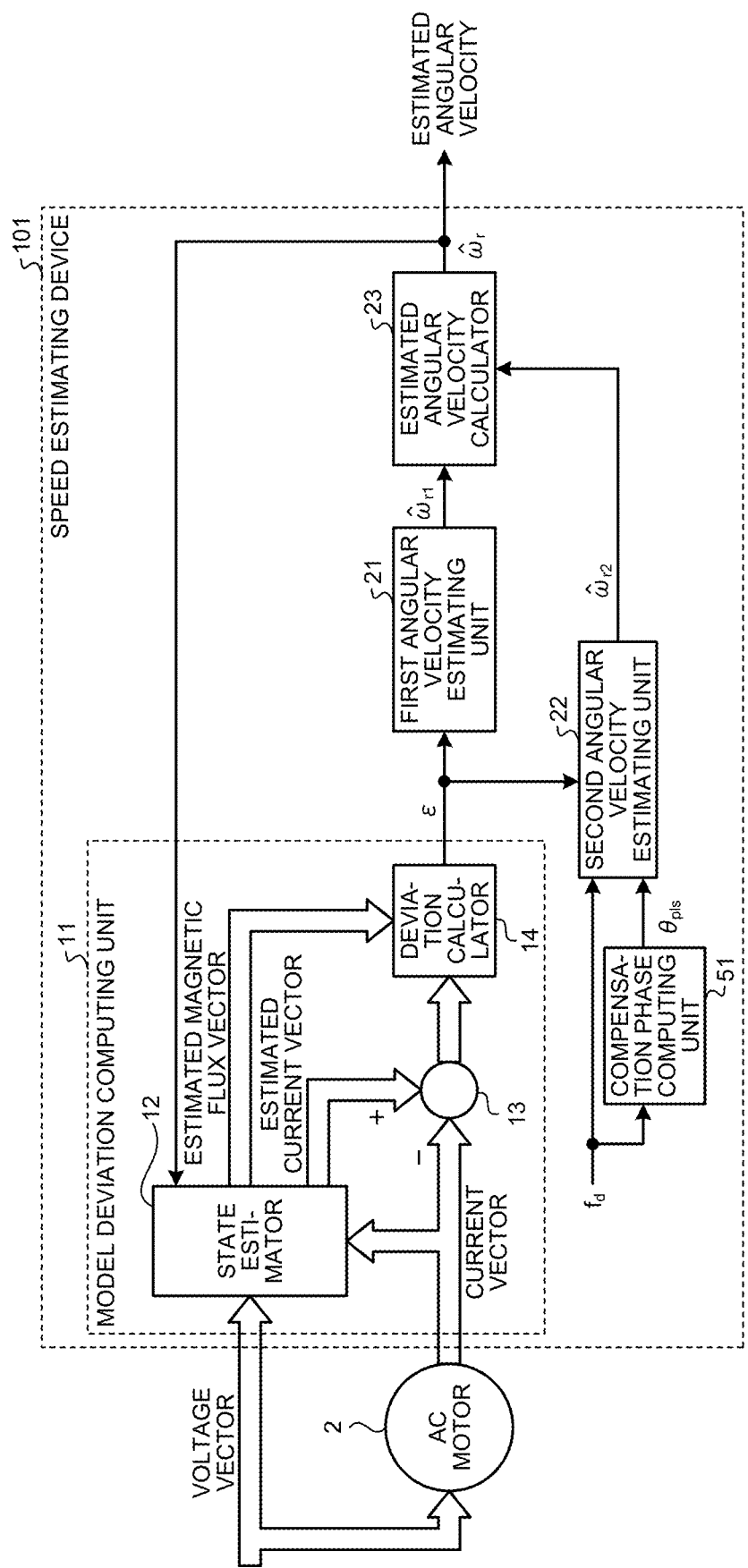
FIG. 1 is a block diagram illustrating a configuration of a speed estimating device for an AC motor according to a first embodiment.

FIG. 1 is a block diagram illustrating a configuration of a speed estimating device 101 for an AC motor according to a first embodiment. The speed estimating device 101 illustrated in FIG. 1 estimates the rotational speed of an AC motor 2 in a technique of an adaptive observer using a voltage vector applied to the AC motor 2 and a current vector, and outputs the estimation result as an estimated angular velocity $\hat{\omega}_r$.

The speed estimating device 101 includes a model deviation computing unit 11, a first angular velocity estimating unit 21, a compensation phase computing unit 51, a second angular velocity estimating unit 22, and an estimated angular velocity calculator 23.

The model deviation computing unit 11 computes a model deviation ε on the basis of the voltage vector, the current vector, and the estimated angular velocity $\hat{\omega}_r$. The first angular velocity estimating unit 21 calculates a first estimated angular velocity $\hat{\omega}_{r1}$ on the basis of the model deviation ε. The compensation phase computing unit 51 computes a compensation phase $\theta_{pls}$ on the basis of a specific disturbance frequency $f_d$. The second angular velocity estimating unit 22 calculates a second estimated angular velocity $\hat{\omega}_{r2}$ on the basis of the compensation phase $\theta_{pls}$, the model deviation ε, and the disturbance frequency $f_d$. The estimated angular velocity calculator 23 calculates an estimated angular velocity $\hat{\omega}_r$ of the AC motor 2 on the basis of the first estimated angular velocity $\hat{\omega}_{r1}$ and the second estimated angular velocity $\hat{\omega}_{r2}$.

The speed estimating device 101 includes the compensation phase computing unit 51 and the second angular velocity estimating unit 22, and operations performed by these components are one of the characteristics of the present invention. Details of the compensation phase computing unit 51 and the second angular velocity estimating unit 22 will be described later.

In the first embodiment, the disturbance frequency $f_d$ is assumed to be known. The disturbance frequency $f_d$ may be obtained in any manner. For example, in such a system in which disturbance of a particular frequency occurs, the disturbance frequency $f_d$ can be provided as a constant in advance. Alternatively, in such an application as a compressor in which disturbance depending on rotational frequency occurs, the rotational frequency can be used as the disturbance frequency $f_d$. The rotational frequency mentioned herein can be acquired by a rotational position sensor or a velocity sensor. Alternatively, in a case of a device including angular velocity estimating means as in the first embodiment, the rotational frequency can be obtained from the estimated angular velocity $\hat{\omega}_r$. Still alternatively, the frequency of torque pulsation may be detected or estimated by a torque meter, an acceleration sensor, or a vibration sensor, and used as the disturbance frequency $f_d$.

The first angular velocity estimating unit 21 and the second angular velocity estimating unit 22 both estimate angular velocity. The difference therebetween lies in a frequency for an angular velocity to be estimated. While the first embodiment is directed to a configuration in which the first angular velocity estimating unit 21 estimates a low-frequency component including a direct-current (DC) component of an angular velocity and the second angular velocity estimating unit 22 estimates a high-frequency component of the angular velocity, the present invention is not limited to this configuration. Needless to say, an opposite configuration can alternatively be used, in which the first angular velocity estimating unit 21 estimates a higher angular velocity frequency component.

Next, a configuration and functions of the model deviation computing unit 11 will be described. The model deviation computing unit 11 includes a state estimator 12, a subtractor 13, and a deviation calculator 14. The state estimator 12 calculates and outputs an estimated magnetic flux vector and an estimated current vector on the basis of the voltage vector applied to the AC motor 2, the current vector outputted by the AC motor 2, and the estimated angular velocity $\hat{\omega}_r$. The estimated angular velocity $\hat{\omega}_r$ is an estimated angular velocity calculated by the aforementioned estimated angular velocity calculator 23, and is also an output of the speed estimating device 101.

The subtractor 13 subtracts the current vector from the estimated current vector to calculate a current deviation vector. The deviation calculator 14 receives the current deviation vector as its input, extracts an orthogonal component of the estimated magnetic flux vector as a scalar quantity, and outputs a value of the quantity as the model deviation ε. Note that the technique for extracting an orthogonal component of an estimated magnetic flux vector as a scalar quantity is publicly known. For example, there are publicly known a technique of performing coordinate transformation on a current deviation vector to two rotational axes, a technique of computing the magnitude of the cross product of the current deviation vector and the estimated magnetic flux vector, and more.

Specifically, the state estimator 12 estimates an electric current and a magnetic flux according to a state equation of the AC motor 2. While the AC motor 2 is assumed to be a typical embedded magnet type synchronous electric AC motor in this example, any other AC motors can also be used as long as a state equation similar to that described below can be established in the state estimator 12. Examples of other AC motors include a surface magnet type synchronous electric motor and an induction electric motor.

In the case of an embedded magnet type synchronous AC motor, the state equation is expressed by the following equations (1) and (2).

[Formula 1]

$$\frac{d}{dt}\begin{bmatrix}\hat{\phi}_{ds}\\\hat{\phi}_{qs}\\\hat{\phi}_{dr}\end{bmatrix} = \left(\begin{bmatrix}-\frac{R}{L_d} & \omega & 0\\-\omega & -\frac{R}{L_q} & -\hat{\omega}_r\\0 & 0 & 0\end{bmatrix}\begin{bmatrix}\hat{\phi}_{ds}\\\hat{\phi}_{qs}\\\hat{\phi}_{dr}\end{bmatrix} + \begin{bmatrix}v_{ds}\\v_{qs}\\0\end{bmatrix} - \begin{bmatrix}h_{11} & h_{12}\\h_{21} & h_{22}\\h_{31} & h_{32}\end{bmatrix}\begin{bmatrix}\hat{i}_{ds}-i_{ds}\\\hat{i}_{qs}-i_{qs}\end{bmatrix}\right) \quad (1)$$

[Formula 2]

$$\begin{bmatrix}\hat{i}_{ds}\\\hat{i}_{qs}\end{bmatrix} = \begin{bmatrix}1/L_d & 0 & 0\\0 & 1/L_q & 0\end{bmatrix}\begin{bmatrix}\hat{\phi}_{ds}\\\hat{\phi}_{qs}\\\hat{\phi}_{dr}\end{bmatrix} \quad (2)$$

In the equations (1) and (2), $L_d$ and $L_q$ represent inductances on a d-axis and a q-axis, respectively. R represents an armature resistance. $\omega$ represents a primary angular frequency. $\omega_r$ represents an angular velocity. $v_{ds}$ represents a d-axis voltage. $v_{qs}$ represents a q-axis voltage. $i_{ds}$ represents a d-axis current. $i_{qs}$ represents a q-axis current. $\varphi_{ds}$ represents a d-axis stator magnetic flux. $\varphi_{qs}$ represents a q-axis stator magnetic flux. $\varphi_{dr}$ represents a d-axis rotor magnetic flux. $h_{11}$ to $h_{32}$ represent observer gains. A symbol "^" represents an estimated value.

Note that the primary angular frequency is given as expressed according to the following equation (3).

[Formula 3]

$$\omega = \hat{\omega}_r - \frac{h_{41}(\hat{i}_{ds}-i_{ds}) + h_{42}(\hat{i}_{qs}-i_{qs})}{\hat{\phi}_{dr}} \quad (3)$$

In the above equation (3), $h_{41}$ and $h_{42}$ represent observer gains similarly to the aforementioned $h_{11}$ to $h_{32}$.

While the above equations (1) and (2) are equations based on normal induced voltage, similar calculation can be performed with modifying the above equations (1) and (2) to express a form using an extended induced voltage. Because the above equation (1) includes the estimated angular velocity $\hat{\omega}_r$, an error occurs in current estimation when the estimated angular velocity $\hat{\omega}_r$ and an actual angular velocity $\omega_r$ are not equal to each other. Herein, the model deviation ε is defined according to the following equation (4). The speed estimating device 101 adjusts the value of the estimated angular velocity $\hat{\omega}_r$ with use of the first angular velocity estimating unit 21 and the second angular velocity estimating unit 22 so that the model deviation ε becomes zero.

[Formula 4]

$$\varepsilon = \frac{\hat{i}_{qs}-i_{qs}}{\hat{\phi}_{dr}} \quad (4)$$

As described above, one of characteristics of the speed estimating device 101 is that the speed estimating device 101 has the compensation phase computing unit 51 and the second angular velocity estimating unit 22. In order to explain this characteristic, a speed estimating device that does not have the compensation phase computing unit 51 and the second angular velocity estimating unit 22 will first be explained as a comparative example herein.

Figure 2:
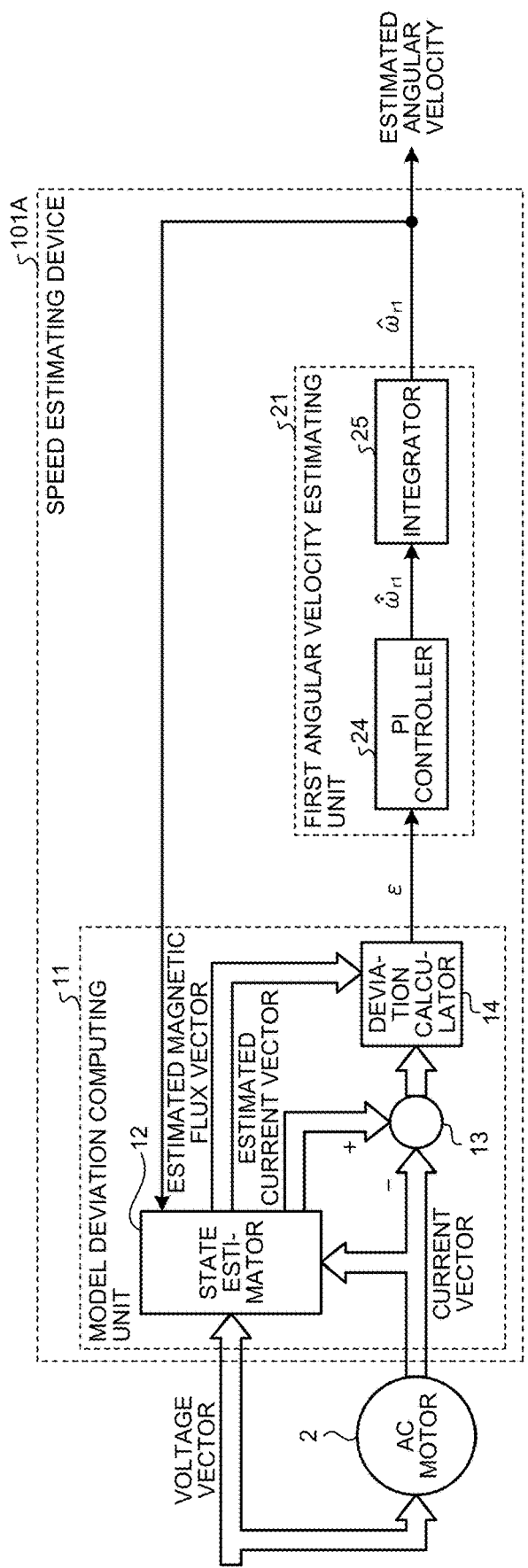
FIG. 2 is a block diagram illustrating a configuration of a speed estimating device according to a comparative example.

FIG. 2 is a block diagram illustrating a configuration of a speed estimating device 101A according to the comparative example. The speed estimating device 101A illustrated in FIG. 2 operates in accordance with a sensorless vector control method in a manner similar to the speed estimating device 101 illustrated in FIG. 1. The speed estimating device 101A operates to adjust the model deviation ε to zero only by using the first angular velocity estimating unit 21.

In the speed estimating device 101A illustrated in FIG. 2, the first angular velocity estimating unit 21 includes a proportional integral (PI) controller 24 and an integrator 25. The first angular velocity estimating unit 21 operates in accordance with the following equation (5).

[Formula 5]

$$\hat{\omega}_r = \frac{1}{s}\left(\left(K_P + \frac{K_I}{s}\right)\cdot\varepsilon\right) \quad (5)$$

In the equation (5), $K_P$ represents a proportional gain of the entire first angular velocity estimating unit 21. $K_I$ represents an integral gain of the entire first angular velocity estimating unit 21. s represents an operator of Laplace transform, s refers to differentiation, and 1/s refers to integration.

In the first angular velocity estimating unit 21, the PI controller 24 computes a first estimated angular acceleration $\hat{\omega}^*_{r1}$ on the basis of the model deviation ε. The integrator 25 integrates the first estimated angular acceleration $\hat{\omega}^*_{r1}$ to compute the first estimated angular velocity $\hat{\omega}^*_{r1}$. In the first angular velocity estimating unit 21, the first estimated angular velocity $\hat{\omega}^{\wedge}_{r1}$ is adjusted by the PI controller 24 and the integrator 25. The first estimated angular velocity $\hat{\omega}^{\wedge}_{r1}$ is outputted to the outside as an output of the speed estimating device 101A. In addition, the first estimated angular velocity $\hat{\omega}^{\wedge}_{r1}$ is fed back to the model deviation computing unit 11. As described above, the PI controller 24 operates as a first angular acceleration estimator, and the integrator 25 operates as a first angular velocity calculator.

In addition, the transfer function Ga(s) from the first estimated angular velocity $\hat{\omega}^{\wedge}_{r1}$ to the model deviation ε is publicly known in the 226-th page of "Speed Sensorless Vector Control Method of Induction Motor Including A Low Speed Region", The transactions of the Institute of Electrical Engineers of Japan (Vol. 120-D, No. 2, 2000) that is a Non Patent Literature. The transfer function Ga(s) can be approximated by a first order lag as in the following equation (6).

[Formula 6]

$$G_a(s) = \frac{A_x}{1+sT_x} \quad (6)$$

Figure 3:
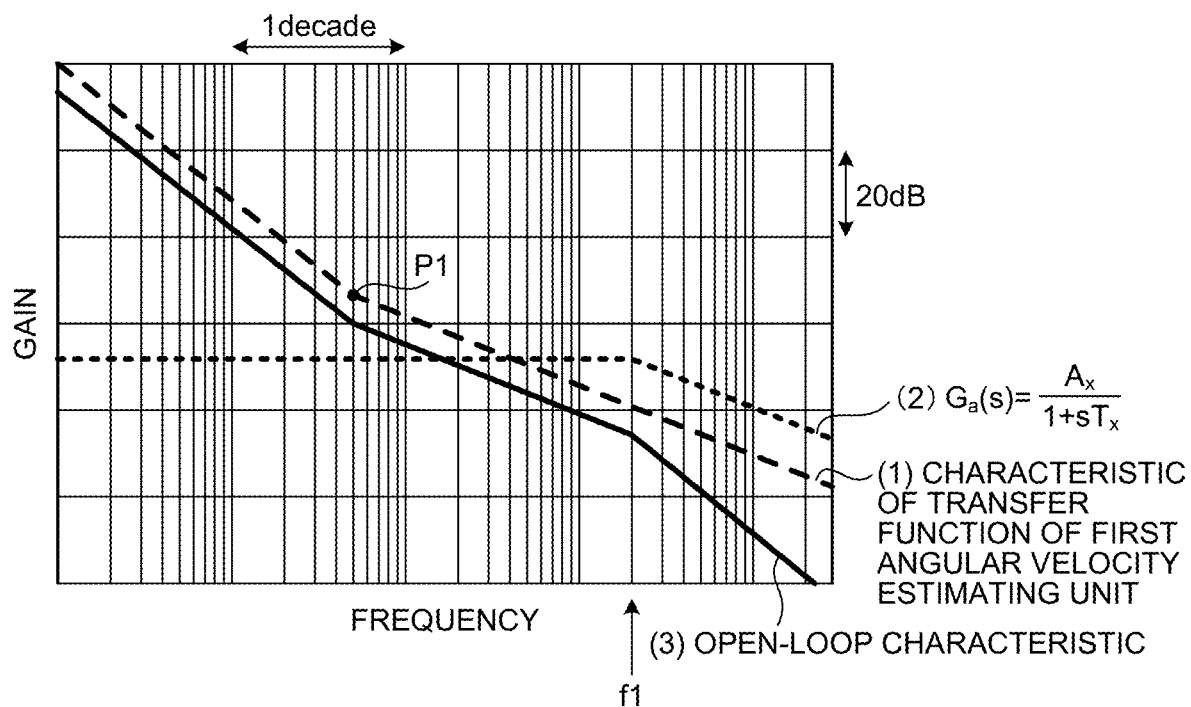
FIG. 3 is a Bode plot illustrating transfer characteristics of the speed estimating device illustrated in FIG. 2.

FIG. 3 is a Bode plot illustrating transfer characteristics of the speed estimating device 101A illustrated in FIG. 2. The horizontal axis represents frequency, and the vertical axis represents gain. A transfer function of (1) illustrated by a broken line in FIG. 3 is designed such that the gain in a lower frequency range is higher. In the transfer function of (1), the gain decreases as the frequency is higher. Specifically, the gain decreases at a rate of −40 [dB/decade] in a low-frequency band, and decreases at a rate of −20 [dB/decade] at frequencies higher than that at a break point P1.

In addition, a transfer function of (2) illustrated by a dotted line in FIG. 3 corresponds to the transfer function Ga(s) of the above equation (6). Because the transfer function Ga(s) has a first order lag characteristic from the first estimated angular velocity $\hat{\omega}_{r1}$ to the model deviation ε, the gain decreases at a rate of −20 [dB/decade] in a frequency range higher than a cutoff angular frequency f1. Addition of the two transfer functions results in a transfer function of (3) having an open loop characteristic illustrated by a solid line.

If PI control gains in the above equation (5), that is, the proportional gain $K_P$ and the integral gain $K_I$ in the first angular velocity estimating unit 21 can be set to be sufficiently large, speed pulsation at high frequencies can be accurately estimated. These gain values, however, are constrained by the estimation computation period and the influence of an error in a motor constant. A forced increase in the gains enhances vulnerability to high-frequency noise, which makes appropriate estimation processing impossible. For this reason, the speed estimating device 101A according to the comparative example has a problem in that it is difficult to capture high-frequency speed pulsation.

Figure 4:
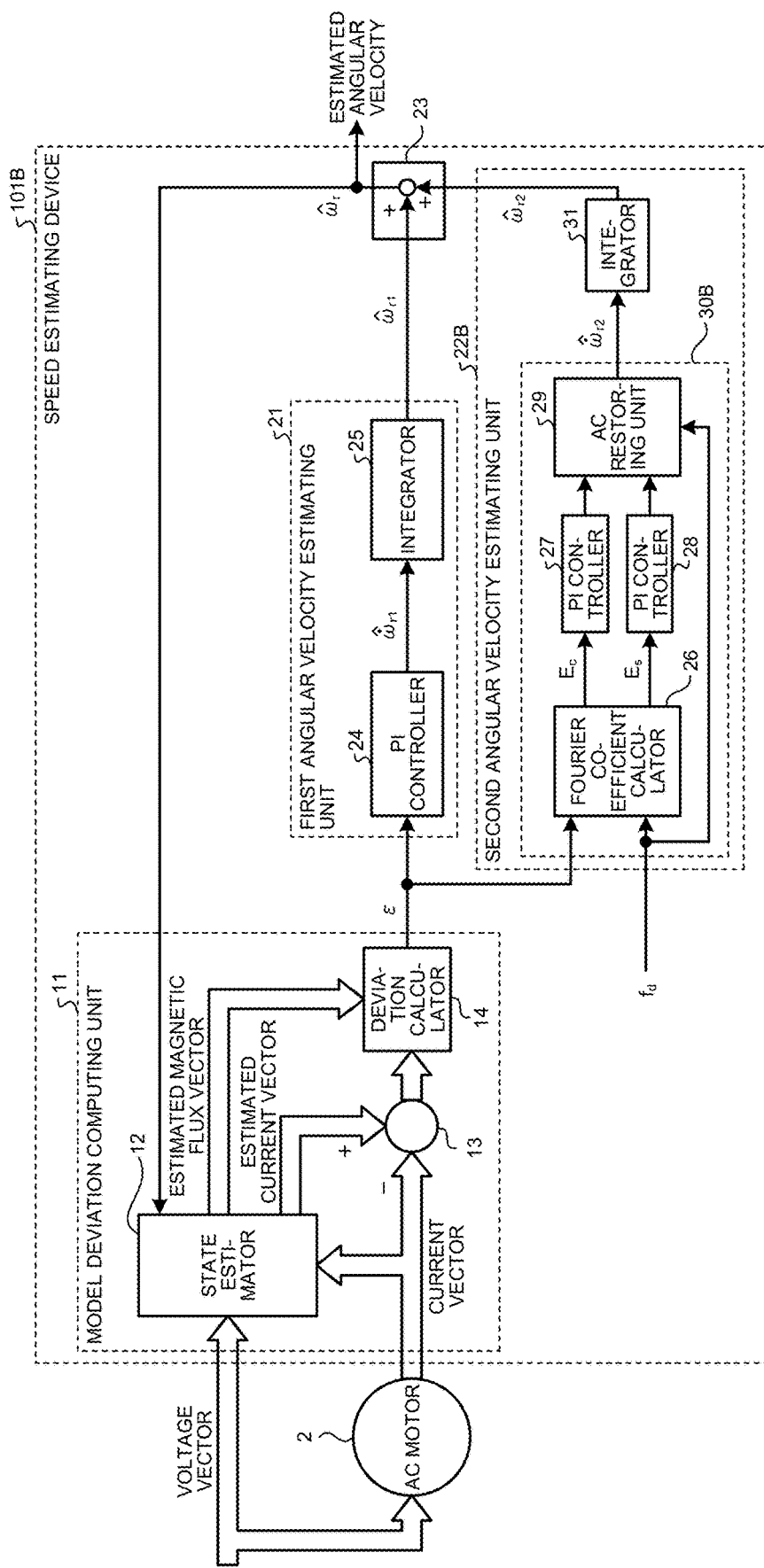
FIG. 4 is a block diagram illustrating a configuration of a speed estimating device according to a comparative example different from that in FIG. 2.

Next, another comparative example will be explained. FIG. 4 is a block diagram illustrating a configuration of a speed estimating device 101B according to a comparative example different from that in FIG. 2. Hereinafter, for distinction from FIG. 2, the comparative example of FIG. 2 will be referred to as a "first comparative example", and the comparative example of FIG. 4 will be referred to as a "second comparative example". As compared with the speed estimating device 101A of FIG. 2, the speed estimating device 101B according to the second comparative example illustrated in FIG. 4 is provided additionally with a second angular velocity estimating unit 22B.

In the speed estimating device 101B of FIG. 4, the second angular velocity estimating unit 22B includes a second angular acceleration estimating unit 30B, and an integrator 31. The second angular acceleration estimating unit 30B computes a second estimated angular acceleration $\hat{\omega}^{}_{r2}$ on the basis of the disturbance frequency $f_d$ and the model deviation ε. The integrator 31 integrates the second estimated angular acceleration $\hat{\omega}^{}_{r2}$ and outputs a second estimated angular velocity $\hat{\omega}^{*}_{r2}$.

In addition, the second angular acceleration estimating unit 30B includes a Fourier coefficient calculator 26, PI controllers 27 and 28, and an AC restoring unit 29.

The Fourier coefficient calculator 26 converts a specific frequency component of the model deviation into direct current, and extracts the obtained DC component. A cosine coefficient $E_c$ and a sine coefficient $E_s$ are outputted from the Fourier coefficient calculator 26, which correspond to the specific frequency component obtained by the DC conversion.

In this process, the cosine coefficient $E_c$ of the model deviation ε and the sine coefficient $E_s$ of the model deviation ε are calculated by the following equations (7) and (8), respectively, on the basis of the model deviation ε and the disturbance frequency $f_d$.

[Formula 7]

$$E_c = \frac{2}{T_d}\int_0^{T_d} \varepsilon \cdot \cos(2\pi f_d t)dt \quad (7)$$

[Formula 8]

$$E_s = \frac{2}{T_d}\int_0^{T_d} \varepsilon \cdot \sin(2\pi f_d t)dt \quad (8)$$

In the formulas (7) and (8), t represents time. In addition, $T_d$ represents a cycle period of disturbance, which is the reciprocal of the disturbance frequency $f_d$. That is, $T_d=1/f_d$.

The cosine coefficient $E_c$ of the model deviation is subjected to PI control by the PI controller 27 as expressed by the following equation (9). In addition, the sine coefficient $E_s$ of the model deviation is subjected to PI control by the PI controller 28 as expressed by the following equation (10).

[Formula 9]

$$\hat{\ddot{\Omega}}_c = \left(K_{P2} + \frac{K_{I2}}{s}\right) \cdot E_c \quad (9)$$

[Formula 10]

$$\hat{\ddot{\Omega}}_s = \left(K_{P2} + \frac{K_{I2}}{s}\right) \cdot E_s \quad (10)$$

In the equations (9) and (10), $K_{P2}$ represents a proportional gain of the entire second angular velocity estimating unit 22B. $K_{I2}$ represents an integral gain of the entire second angular velocity estimating unit 22B. A dot over each character refers to differentiation, and the number of dots represents the order of differentiation.

The AC restoring unit 29 performs computation of the following equation (11) on the basis of the cosine coefficient $E_c$ of the model deviation and the sine coefficient $E_s$ of the model deviation. The equation (11) is an arithmetic expression for calculating the second estimated angular acceleration $\hat{\omega}^{**}_{r2}$.

[Formula 11]

$$\hat{\ddot{\omega}}_{r2} = \hat{\ddot{\Omega}}_c \cos(2\pi f_d t) + \hat{\ddot{\Omega}}_s \sin(2\pi f_d t) \quad (11)$$

Figure 5:
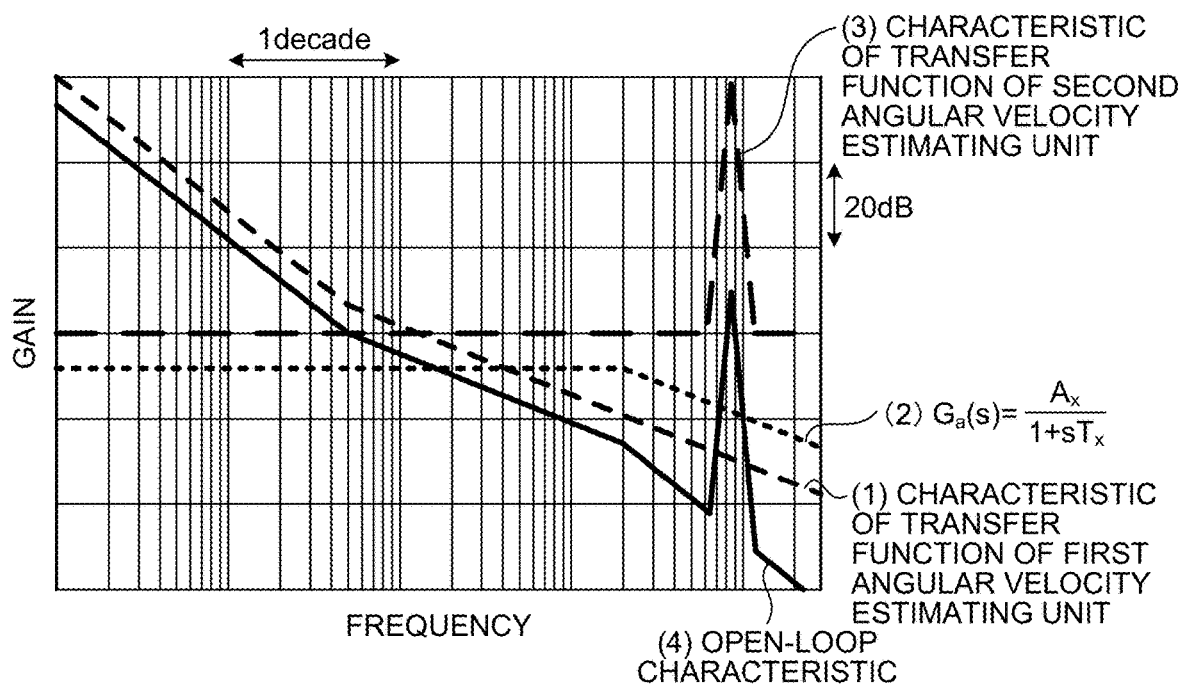
FIG. 5 is a Bode plot illustrating transfer characteristics of the speed estimating device illustrated in FIG. 4.

FIG. 5 is a Bode plot illustrating transfer characteristics of the speed estimating device 101B illustrated in FIG. 4. The horizontal axis represents frequency, and the vertical axis represents gain. A transfer function of (1) in FIG. 5 is the same as the transfer function of (1) in FIG. 3. A transfer function of (2) in FIG. 5 is the same as the transfer function of (2) in FIG. 3. A transfer function of (3) in FIG. 5 represents a transfer function of the second angular velocity estimating unit 22B illustrated in FIG. 4. Addition of the three transfer functions results in an open loop characteristic of (4) illustrated by a solid line.

In FIG. 5 as compared with FIG. 3, the gain in a specific frequency band is higher in the open loop characteristic of (4) illustrated by the solid line. More precisely, the speed estimating device 101B according to the second comparative example increases the gain in a specific frequency band in which occurrence of speed pulsation due to periodic disturbance can be predicted, by using the first angular velocity estimating unit 21 and the second angular velocity estimating unit 22B, thereby making it possible to increase the accuracy of speed estimation. As a result, the speed estimating device 101B according to the second comparative example enables estimation of high-frequency speed pulsation with high accuracy, which is difficult for the speed estimating device 101A according to the first comparative example.

As described above, the speed estimating device 101B according to the second comparative example can estimate high-frequency speed pulsation with high accuracy, but it is envisaged that the control system may be instable depending on the magnitude of phase error. In the circumstances, the inventors of the present application have considered the necessity of phase compensation for a proposal of the present invention, and such consideration will be described below.

Figure 6:
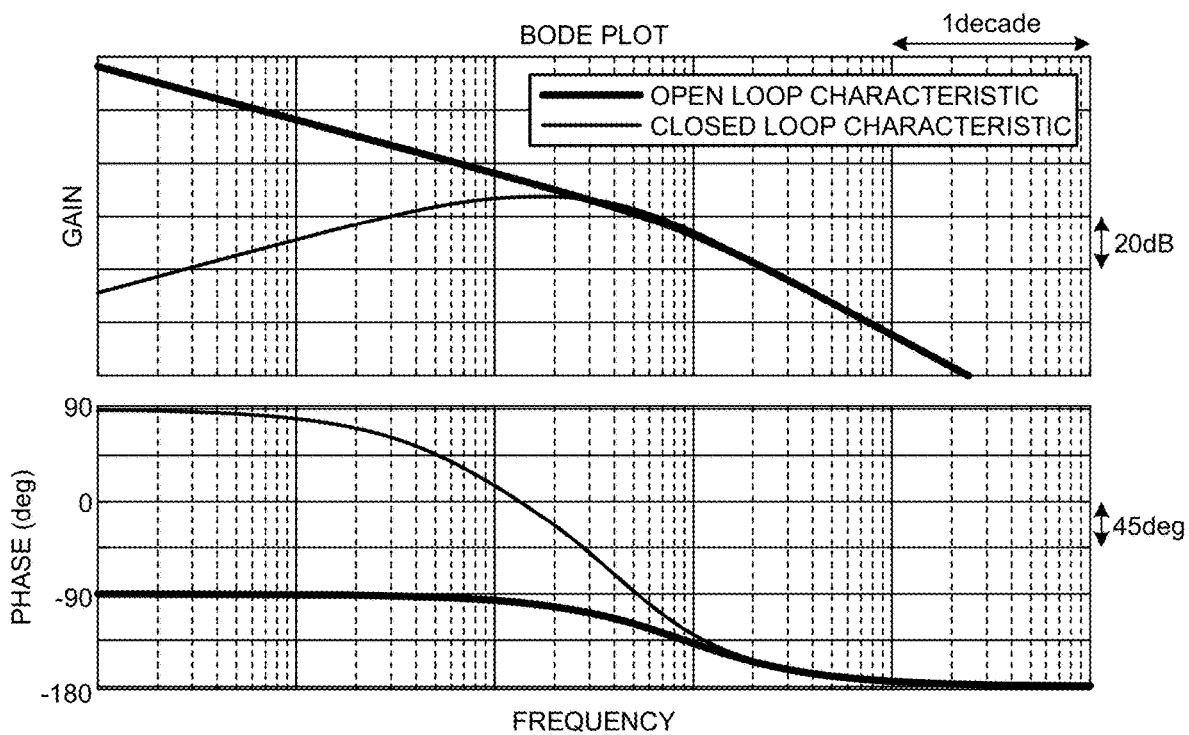
FIG. 6 is a graph used for comparing Bode plots illustrating transfer characteristics from a model deviation ε to a first estimated angular acceleration of the speed estimating device illustrated in FIG. 2 in an open loop characteristic and a closed loop characteristic.

FIG. 6 is a graph used for comparing Bode plots illustrating the transfer characteristics from the model deviation ε to the first estimated angular acceleration $\hat{\omega}^{*}_{r1}$ of the speed estimating device 101A illustrated in FIG. 2 in an open loop characteristic and a closed loop characteristic. The open loop characteristic is a transfer characteristic in a state in which the first estimated angular velocity $\hat{\omega}_{r1}$ is not fed back to the model deviation computing unit 11. The closed loop characteristic is a transfer characteristic in a state in which the first estimated angular velocity $\hat{\omega}_{r1}$ is fed back to the model deviation computing unit 11 as illustrated in FIG. 2. Note that FIGS. 3 and 5 are Bode plots from the model deviation s to the first estimated angular velocity $\hat{\omega}_{r1}$. In contrast, FIG. 6 illustrates the transfer characteristics from input of the model deviation ε to output of the first estimated angular acceleration $\hat{\omega}^{*}_{r1}$, and attention should be paid to a first-order differential characteristic being added to FIGS. 3 and 5. As illustrated in FIG. 4, when the second angular velocity estimating unit 22B computes the second estimated angular acceleration $\hat{\omega}^{*}_{r2}$ on the basis of the model deviation ε, the characteristic from input of the model deviation ε to output of the second estimated angular acceleration $\hat{\omega}^{*}_{r2}$ illustrated in FIG. 6 can be considered as a characteristic to be controlled by the second angular velocity estimating unit 22B.

In feedback control, a technique of design in view of the open loop characteristics of a controlled object and a controller is often used. In this situation, what is considered first is a case of designing the second angular velocity estimating unit in view of the open loop characteristic of the controlled object.

According to the open loop characteristic in FIG. 6, the gain decays at −20 [dB/decade] in a low-frequency band. The phase is −90 [degrees] in the low-frequency band, lags as the frequency is higher, and converges to −180 [degrees]. While the used frequency band depends on an application, the phase can be considered as being substantially constant at −90 [degrees] in a case where a low-frequency band is mainly used. In such a case, if the open loop characteristic is a controlled object in designing the second angular velocity estimating unit, phase compensation seems to be unnecessary.

In fact, however, the PI controllers 27 and 28 serving as second angular acceleration estimators perform computation in a state in which the PI controller 24 serving as the first angular acceleration estimator operates. For this reason, it should be considered that the first estimated angular velocity $\hat{\omega}_{r1}$ estimated by the first angular velocity estimating unit 21 including the PI controller 24 is fed back to the model deviation computing unit 11. Accordingly, the second angular velocity estimating unit 22B needs to be designed in view of the closed loop characteristic to be controlled by the second angular velocity estimating unit 22B.

The closed loop characteristic in FIG. 6 has a first-order integral characteristic in a high-frequency band, and a first-order differential characteristic in a low-frequency band. The gain has a characteristic that lowers at a gradient of −20 [dB/decade] in consistency with the open loop characteristic in a high-frequency band, but a characteristic that increases at a gradient of +20 [dB/decade] in a low-frequency band and makes the gain lower as the frequency is lower. In addition, the phase converges to −180 [degrees] in a high-frequency band, which is consistent with the case of the open loop, but is +90 [degrees] in a low-frequency band. The phase thus changes significantly from +90 [degrees] to −180 [degrees] in the frequency band therebetween.

Note that, as described above, the angular acceleration computation in the second angular velocity estimating unit 22B of the speed estimating device 101B according to the second comparative example is performed using the above equations (7) to (11). The equations (7) and (8) are arithmetic expressions for obtaining the cosine coefficient and the sine coefficient that correspond to DC components, the equations (9) and (10) are arithmetic expressions for PI control, and the equation (11) is an arithmetic expression for restoring an AC component by getting back the DC components into the AC component. In the series of computation processes, the phase is not considered. This means that the phase is assumed not to change depending on frequency in a range from input of the model deviation ε to output of the second estimated angular acceleration $\hat{\omega}^{*}_{r2}$.

For example, as described above, in the case where only the open loop characteristic is deemed to be a controlled object and operation is performed in a low-frequency range, the phase change may be considered as being sufficiently small and it is contemplated to adopt the control design as described above. In fact, however, the phase characteristic of a controlled object greatly changes depending on frequency as illustrated in the Bode plots in FIG. 6. For this reason, unless an estimated angular acceleration is calculated in view of the fact that the phase characteristic of a controlled object changes depending on disturbance frequency, an error with respect to an estimated phase of appropriate angular acceleration is caused.

The second angular acceleration estimating unit 30B in the second comparative example computes an angular acceleration with use of the PI controllers 27 and 28. With this configuration, when a phase error is sufficiently small, the phase may converge to an appropriate value as a result of adjustment of a control quantity by the PI controllers 27 and 28. In a frequency band in which a phase error is significantly large, however, control may become instable.

Figure 7:
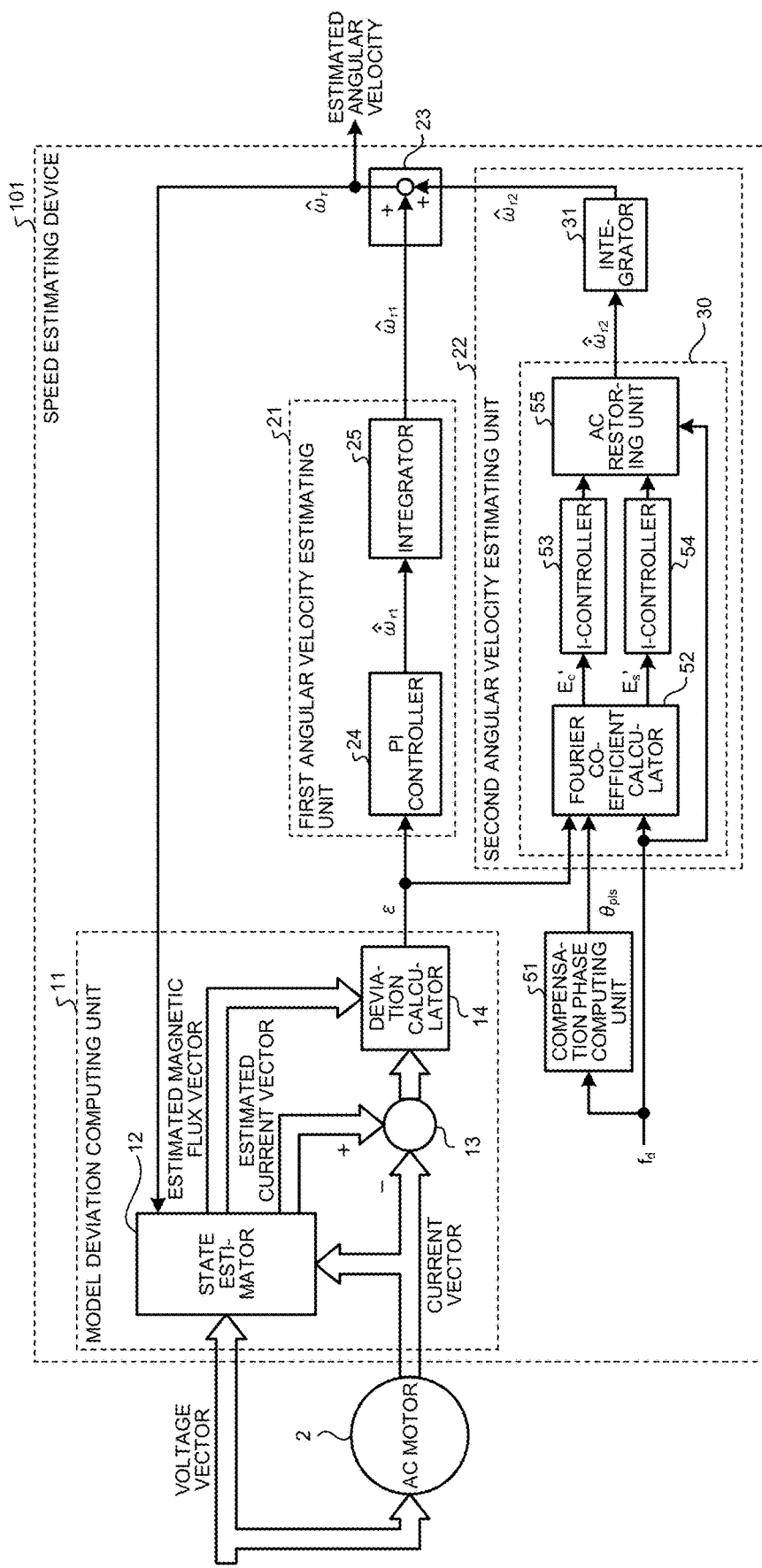
FIG. 7 is a block diagram illustrating a detailed configuration of a second angular velocity estimating unit in the speed estimating device illustrated in FIG. 1.

In the circumstances, in the first embodiment, the second angular velocity estimating unit 22 includes a control system for performing phase compensation such that an angular velocity can be computed with an appropriate phase. FIG. 7 is a block diagram illustrating a detailed configuration of the second angular velocity estimating unit 22 in the speed estimating device 101 illustrated in FIG. 1. As illustrated in FIG. 7, the second angular acceleration estimating unit 30 includes a Fourier coefficient calculator 52, integral (I-) controllers 53 and 54, and an AC restoring unit 55. In the first embodiment, the second angular acceleration estimating unit 30 operates as a specific-frequency angular acceleration estimator. In addition, in the second angular acceleration estimating unit 30, the Fourier coefficient calculator 52 operates as a specific frequency extractor that extracts a specific frequency component, and the I-controllers 53 and 54 and the AC restoring unit 55 operate as a specific-frequency angular velocity estimator.

In FIG. 7, the disturbance frequency $f_d$ is inputted to the compensation phase computing unit 51, the Fourier coefficient calculator 52, and the AC restoring unit 55. The compensation phase computing unit 51 determines a compensation phase $\theta_{pls}$ in view of the closed loop characteristic to be controlled. Specifically, the compensation phase $\theta_{pls}$ is stored as a map associated with the disturbance frequency, and the compensation phase $\theta_{pls}$ can be determined by reference to the map. Alternatively, an approximation formula that is changed depending on disturbance frequency may be held, and the compensation phase $\theta_{pls}$ may be determined using the approximation formula. The compensation phase $\theta_{pls}$ is inputted to the Fourier coefficient calculator 52.

The Fourier coefficient calculator 52 obtains the cosine coefficient $E_c'$ and the sine coefficient $E_s'$ of the model deviation on the basis of the disturbance frequency $f_d$ and the compensation phase $\theta_{pls}$ using the following equations (12) and (13).

[Formula 12]

$$E_c' = \frac{2}{T_d} \int_0^{T_d} \varepsilon \cdot \cos(2\pi f_d t + \theta_{pls}) dt \quad (12)$$

[Formula 13]

$$E_s' = \frac{2}{T_d} \int_0^{T_d} \varepsilon \cdot \sin(2\pi f_d t + \theta_{pls}) dt \quad (13)$$

The cosine coefficient $E_c'$ of the model deviation is subjected to I-control by the I-controller 53 as expressed by the following equation (14). In addition, the sine coefficient $E_s'$ of the model deviation is subjected to I-control by the I-controller 54 as expressed by the following equation (15).

[Formula 14]

$$\hat{\Omega}_c' = \left(\frac{K_{rpl\_i}}{s}\right) \cdot E_c' \quad (14)$$

[Formula 15]

$$\hat{\Omega}_s' = \left(\frac{K_{rpl\_i}}{s}\right) \cdot E_s' \quad (15)$$

In the above equations (14) and (15), $K_{rpl\_1}$ represents the integral gain of the I-controllers 53 and 54. Note that the cosine coefficient $E_c'$ and the sine coefficient $E_s'$ that are control inputs in the I-controllers 53 and 54 are in a dimension of an angular velocity, whereas control outputs of the I-controllers 53 and 54 are in a dimension of an angular acceleration. In addition, conversion from an angular velocity to an angular acceleration has a relation of differentiation, whereas a controlled object naturally has an integral characteristic. Thus, in a coordinate system resulting from conversion to direct current, the cosine coefficient $E_c'$ and the sine coefficient $E_s'$ that are control inputs each appear as a gain of a multiple of conversion frequency. The cosine coefficient $E_c'$ and the sine coefficient $E_s'$ are therefore regarded as a proportional characteristic in this coordinate system rather than an integral characteristic. In this situation, control can be performed only by integrators, and the I-controllers 53 and 54 are thus used. Needless to say, PI controllers may be used where necessary as in the second comparative example in order to improve the responsiveness.

The AC restoring unit 55 performs the computation of the following equation (16) on the basis of the cosine coefficient $E_c'$ and the sine coefficient $E_s'$. This equation (16) is an arithmetic expression for calculating the second estimated angular acceleration $\hat{\omega}_{r2}$.

[Formula 16]

$$\hat{\omega}_{r2} = (\hat{\Omega}_c' \cos(2\pi f_d t) + \hat{\Omega}_s' \sin(2\pi f_d t)) \quad (16)$$

FIG. 9 is a first graph used for explaining the effect of the speed estimating device 101 according to the first embodiment. FIG. 10 is a second graph used for explaining the effect of the speed estimating device 101 according to the first embodiment. FIGS. 9 and 10 both illustrate an example of a result of simulation in which the AC motor 2 is driven with being provided with speed pulsation and the rotational speed of the AC motor 2 is estimated. In this simulation, the second angular velocity estimating unit 22 is activated and speed pulsation estimation is started five seconds after the AC motor 2 is driven.

In addition, FIG. 9 illustrates waveforms obtained by plotting cosine components $\hat{\Omega}_c$ of an angular acceleration estimated with the estimation response being set to 1 [rad/s], and sine components $\hat{\Omega}_s$ of the angular acceleration. Upper part thereof illustrates waveforms in a case without phase compensation, which corresponds to a result obtained by the configuration in the second comparative example. Lower part thereof illustrates waveforms in a case with phase compensation, which corresponds to a result obtained by the configuration of the first embodiment.

In the case without phase compensation, because some error is caused in an estimated phase of speed pulsation as described above, the value of angular acceleration does not converge but diverges, and a set response cannot be obtained. In contrast, in the case with phase compensation, it can be seen that the estimated angular acceleration converges and the operation is stable. In addition, it can be seen that the response speed rises by 63% in about one second from the start of estimation, and desired response is thus achieved.

In addition, FIG. 10 illustrates waveforms of an estimated angular velocity, upper part thereof illustrates a case without phase compensation, and lower part thereof illustrates a case with phase compensation. A left part of each of the upper and lower parts illustrates waveforms before activation of the second angular velocity estimating unit 22, and a right part of each of the upper and lower parts illustrates waveforms after the second angular velocity estimating unit 22 is activated and the value has converged. Each thick curve represents an actual angular velocity, and each thin curve represents an estimated angular velocity.

Before the activation, the phase of the estimated angular velocity lags behind the actual angular velocity, and also the amplitude of the estimated angular velocity is smaller than that of the actual angular velocity. After the activation, in the case without phase compensation, the control diverges and the amplitude of the estimated angular velocity is significantly larger than that of the actual angular velocity, and also the phase thereof has a difference from the latter. In contrast, in the case with phase compensation, the estimated angular velocity is equal to the actual angular velocity, and it is seen that the control is performed satisfactorily.

The integrator 31 integrates the second estimated angular acceleration $\hat{\omega}'_{r2}$ computed by the AC restoring unit 55 according to the following equation (17) to obtain the second estimated angular velocity $\hat{\omega}_{r2}$. The integrator 31 operates as a second angular velocity calculator. The second estimated angular velocity $\hat{\omega}_{r2}$ is computed as a specific high-frequency component of the actual angular velocity.

[Formula 17]

$$\hat{\omega}_{r2} = \frac{1}{s}\hat{\omega}'_{r2} \quad (17)$$

Figure 8:
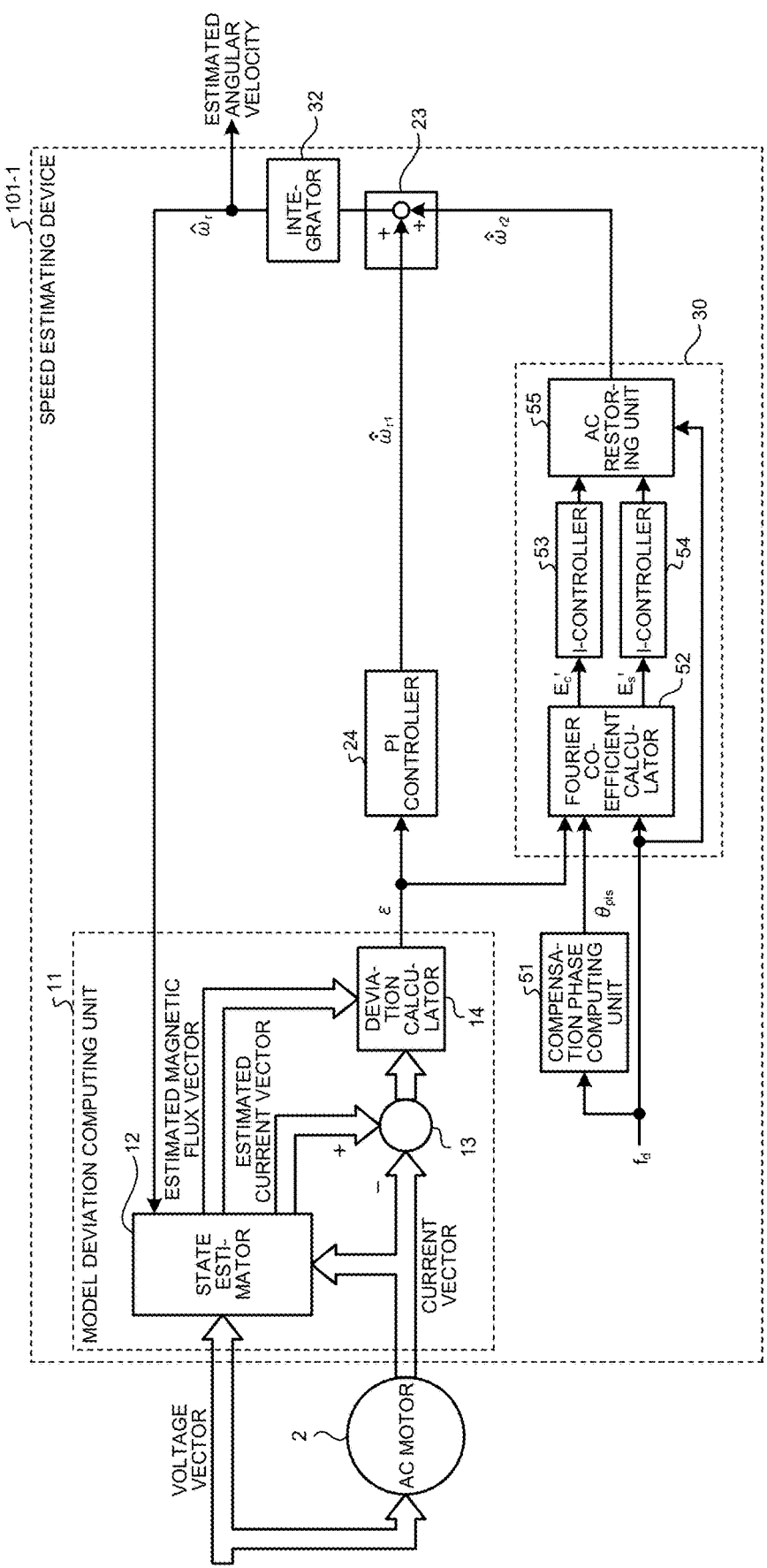
FIG. 8 is a block diagram illustrating a modification of the detailed configuration illustrated in FIG. 7.

Note that it is obvious for a person skilled in the art that a block diagram of a control system can be modified. For example, a configuration may be realized as in FIG. 8. FIG. 8 is a block diagram illustrating a modification of a configuration of a detail part illustrated in FIG. 7. For example, the configuration of the integrators 25 and 31 in FIG. 7 may be modified to be a configuration such that the estimated angular accelerations are added before passing through an integrator. Specifically, while two integrators 25 and 31 are located on input sides of the estimated angular velocity calculator 23 in the configuration of FIG. 7, one integrator 32 may be located on an output side of the estimated angular velocity calculator 23 as in a speed estimating device 101-1 of FIG. 8. This configuration produces an advantageous effect that it is possible to reduce the number of integrators.

An equation for estimating a final angular velocity is expressed by the following equation (18). Specifically, in the estimated angular velocity calculator 23, the second estimated angular velocity $\hat{\omega}_{r2}$ calculated by the integrator 31 is added to the first estimated angular velocity $\hat{\omega}_{r1}$ computed by the first angular velocity estimating unit 21, thereby obtaining the estimated angular velocity $\hat{\omega}_r$ expressed by the following equation (18).

[Formula 18]

$$\hat{\omega}_r = \frac{1}{s}\left(\left(K_P + \frac{K_I}{s}\right)\cdot\varepsilon\right) + \hat{\omega}_{r2} \quad (18)$$

While an example of using an adder is described in the above equation (18) and in the estimated angular velocity calculator 23 illustrated in FIG. 7, the present invention is not limited to this example. In such a case where the definition of positive or negative of the compensation phase in the compensation phase computing unit 51 and the definition of an output of the AC restoring unit 55 are opposite in phase, a subtractor is used. In other words, the configuration of the estimated angular velocity calculator 23 is determined depending on the definition of positive or negative of the compensation phase, the definition of an output from the AC restoring unit 55, and the like.

A difference between the equation (18) and the equation (5) lies in that the second estimated angular velocity $\hat{\omega}_{r2}$ is used in the equation (18). The second angular velocity estimating unit 22 converts a given harmonic wave of the model deviation ε into direct currents by dividing the harmonic wave into a sine wave and a cosine wave, extracts the sine wave and the cosine wave, and performs I-control so that the sine wave and the cosine wave become zero. The second angular velocity estimating unit 22 then restores the output of the I-control to an alternating current to estimate a high-frequency component of the actual angular velocity, and increases the gain only in a part with a determined frequency. Thus, a speed pulsation component due to periodic disturbance can be estimated as the second estimated angular velocity $\hat{\omega}_{r2}$ with high accuracy. Note that the second angular velocity estimating unit 22 described above has a structure of a sort of iterative controller or a learning controller. Another sort of iterative controller or a learning controller may therefore be used instead of the second angular velocity estimating unit 22.

Figure 11:
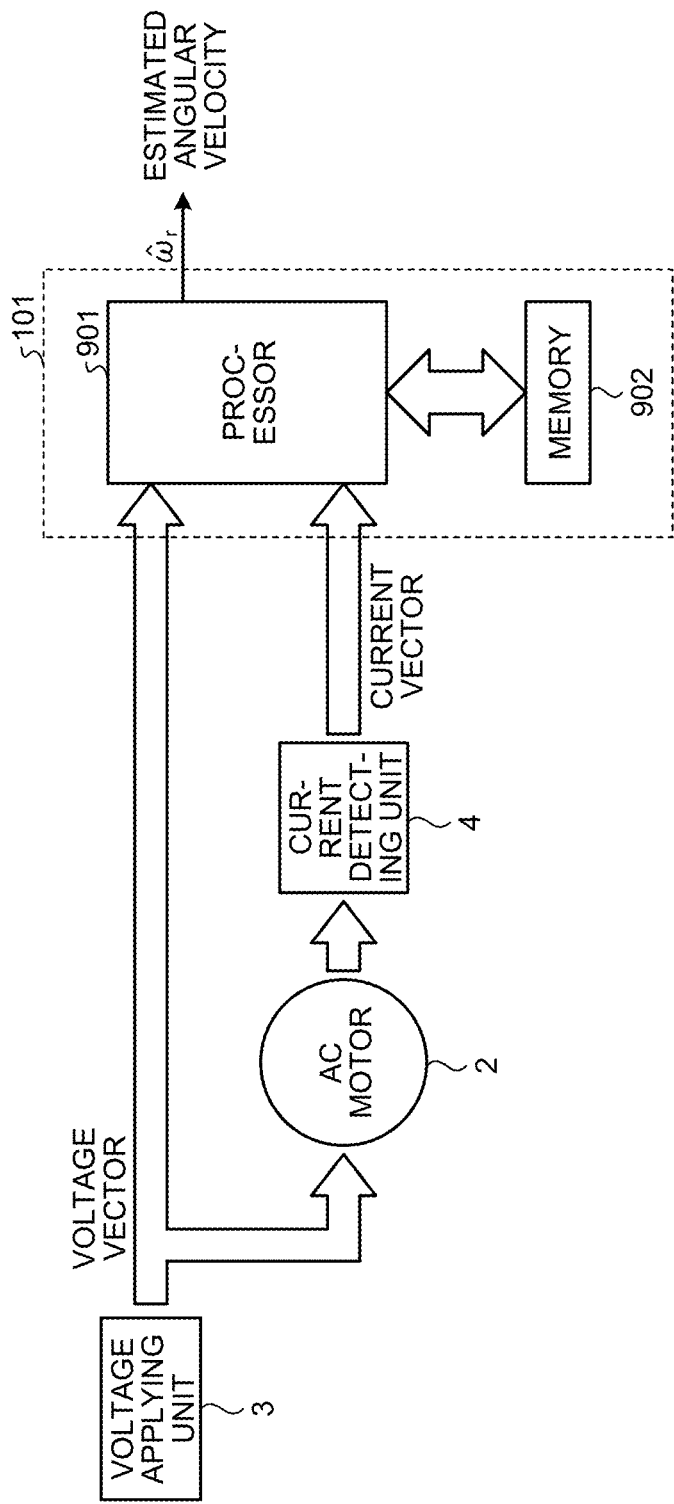
FIG. 11 is a hardware configuration diagram of the speed estimating device according to the first embodiment.

FIG. 11 is a hardware configuration diagram of the speed estimating device 101 according to the first embodiment. Although not illustrated in FIGS. 1 and 7, a voltage applying unit 3 and a current detecting unit 4 are illustrated in FIG. 11. The voltage applying unit 3 serves as voltage applying means for applying a voltage to the AC motor 2. An example of the voltage applying means is a power converter. The voltage vector corresponds to a voltage command generated by the voltage applying unit 3. A voltage generated on the basis of the voltage command is applied to the AC motor 2, and information on the voltage command is inputted to the speed estimating device 101. In addition, the current vector is generated by the current detecting unit 4 and inputted to the speed estimating device 101. The current vector is vector information on an AC current flowing in the AC motor 2. An example of the current vector is a detected value of a dq-axis current obtained by converting an AC current detected by the current detecting unit 4 into a value on dq-coordinate axes.

The speed estimating device 101 includes a processor 901 and a memory 902. The memory 902 includes a volatile storage device, which is not illustrated, typified by a random access memory, and a nonvolatile auxiliary storage device, which is not illustrated, typified by a flash memory. Note that the memory 902 may include an auxiliary storage device of a hard disk instead of the volatile storage device and the nonvolatile auxiliary storage device. The processor 901 executes a program inputted from the memory 902. Because the memory 902 includes the auxiliary storage device and the volatile storage device, a program is inputted from the auxiliary storage device to the processor 901 via the volatile storage device. The processor 901 may output data on a computation result to the volatile storage device of the memory 902, and may save the data into the auxiliary storage device via the volatile storage device.

Various systems have been considered for the voltage applying unit 3 and the current detecting unit 4, and basically any system may be used therefor. The voltage applying unit 3 and the current detecting unit 4 may be provided inside the speed estimating device 101. In addition, the speed estimating device 101 may include voltage detecting means for detecting the voltage vector outputted by the voltage applying unit 3. In this case, the voltage applying unit 3 may be configured to transmit a voltage vector command value to the processor 901, for a numerical value relating to the voltage detected by the voltage detecting means to be transmitted to the processor 901. The current detecting unit 4 may also be configured to transmit a detected numerical value to the processor 901.

The processor 901 computes the estimated angular velocity $\hat{\omega}_r$ on the basis of the current vector and the voltage vector of the AC motor 2. By the processor 901 performing the computation of the second angular velocity estimating unit 22 described above, the speed pulsation due to periodic disturbance can be estimated with high accuracy. Note that the processor 901 may also serve as the driving device for the AC motor 2. Specifically, the processor 901 may be configured to not only perform the speed estimation but also calculate a voltage command vector such that an estimated speed has a desired value. There are publicly known various methods for performing position-sensorless torque control, including that of Non Patent Literature mentioned above.

As described above, the speed estimating device for an AC motor according to the first embodiment can estimate speed pulsation of the AC motor with an appropriate phase regardless of frequency, and can realize higher accuracy of speed estimation.

In addition, the speed estimating device for an AC motor according to the first embodiment enables speed estimation with high accuracy even in a case of high pulsation frequency, which has been a problem in the conventional art, and can also estimate pulsation in a higher frequency range than in the conventional art by virtue of provision of a computation unit for increasing the estimation response in a specific frequency band even if a special storage means is not provided therefor. Furthermore, because the compensation phase is obtained in view of the closed loop phase characteristic of angular velocity estimation of the first angular velocity estimating unit that is an adaptive magnetic-flux observer, the angular velocity estimation can be performed at a desired response speed, and stable control can be achieved.

Second Embodiment

Figure 12:
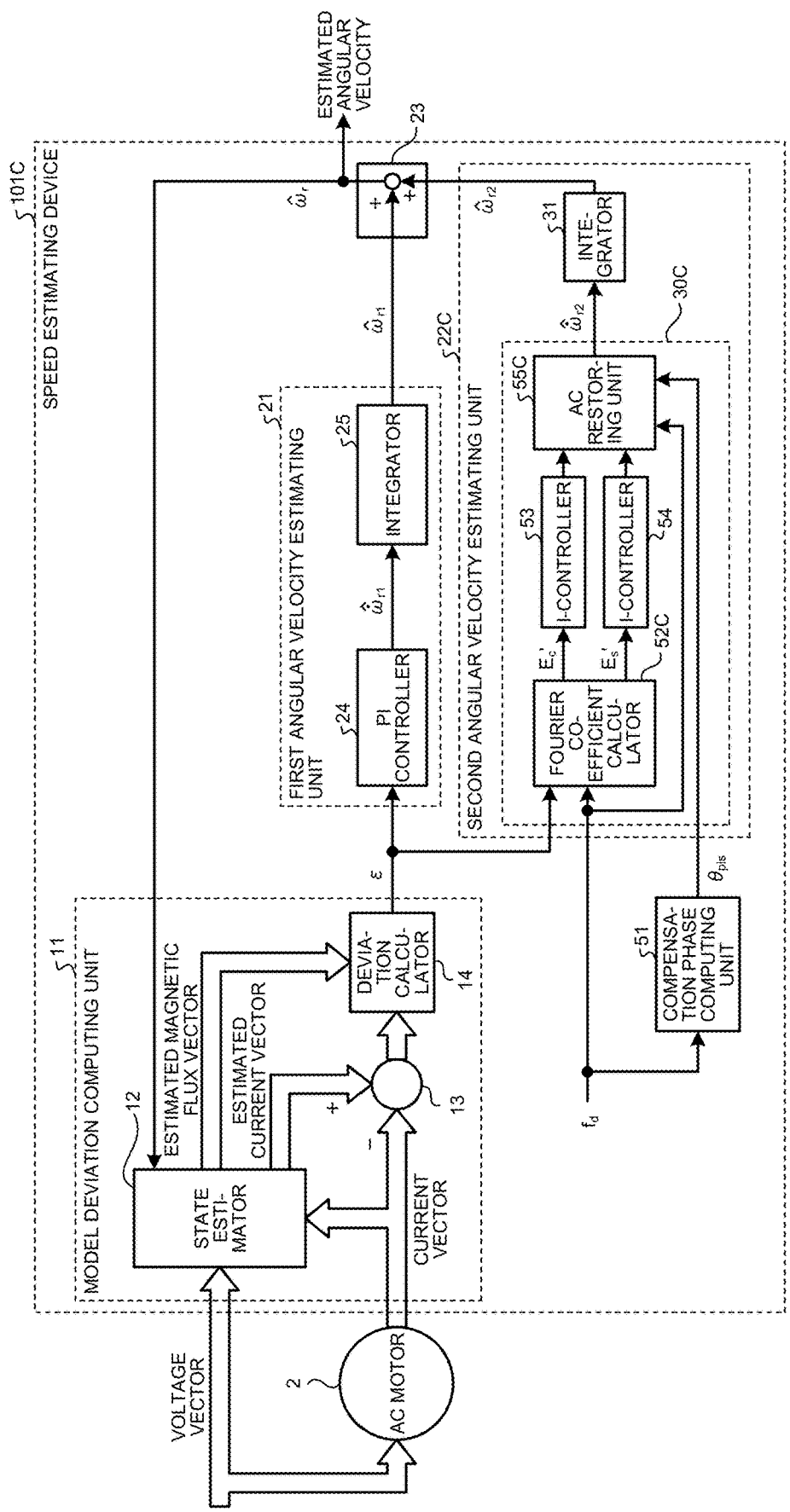
FIG. 12 is a block diagram illustrating a configuration of a speed estimating device according to a second embodiment.

FIG. 12 is a block diagram illustrating a configuration of a speed estimating device 101C according to a second embodiment. In FIG. 12, in the speed estimating device 101C according to the second embodiment, the second angular velocity estimating unit 22 in the configuration of the speed estimating device 101 according to the first embodiment illustrated in FIG. 7 is replaced with a second angular velocity estimating unit 22C. In the second angular velocity estimating unit 22C, the second angular acceleration estimating unit 30 is replaced with a second angular acceleration estimating unit 30C. In the second angular acceleration estimating unit 30C, the Fourier coefficient calculator 52 is replaced with a Fourier coefficient calculator 52C, and the AC restoring unit 55 is replaced with an AC restoring unit 55C. While the compensation phase $\theta_{pls}$ computed by the compensation phase computing unit 51 is inputted to the Fourier coefficient calculator 52 in FIG. 7, the compensation phase $\theta_{pls}$ is inputted to the AC restoring unit 55C in FIG. 12. Note that the other configuration is the same as or equivalent to that in FIG. 7, and the same or equivalent components are denoted by the same reference symbols and redundant description thereof will be omitted.

The Fourier coefficient calculator 52 of the first embodiment illustrated in FIG. 7 computes Fourier coefficients by using the equations (12) and (13). On the other hand, the Fourier coefficient calculator 52C of the second embodiment illustrated in FIG. 12 computes Fourier coefficients by using the following equations (19) and (20).

[Formula 19]

$$E'_c = \frac{2}{T_d} \int_0^{T_d} \varepsilon \cdot \cos(2\pi f_d t) dt \qquad (19)$$

[Formula 20]

$$E'_s = \frac{2}{T_d} \int_0^{T_d} \varepsilon \cdot \sin(2\pi f_d t) dt \qquad (20)$$

In addition, the AC restoring unit 55 of the first embodiment illustrated in FIG. 7 computes the second estimated angular acceleration $\hat{\omega}^*_{r2}$ by using the above equation (16). In contrast, the AC restoring unit 55C of the second embodiment illustrated in FIG. 12 computes the second estimated angular acceleration $\hat{\omega}^*_{r2}$ by using the following equation (21).

[Formula 21]

$$\omega_{r2} = (\Omega_c' \cos(2\pi f_d t + \theta_{pls}) + \Omega_s' \sin(2\pi f_d t - \theta_{pls})) \qquad (21)$$

If the relation of the phases used for computation by the Fourier coefficient calculator 52 (52C) and the AC restoring unit 55 (55C) is maintained, the effect of estimating speed pulsation with an appropriate phase regardless of frequency, which is mentioned in the first embodiment, can be similarly produced. Thus, computation as expressed by the equations (19) to (21) can produce the same effect.

Note that, in a manner similar to the first embodiment, a configuration in which the cosine coefficient $E_c'$ of the model deviation ε and the sine coefficient $E_s'$ of the model deviation ε are obtained from the I-controllers 53 and 54, respectively, can be adopted also in the second embodiment, and the arithmetic expressions for it are still the equations (14) and (15) with no change.

Third Embodiment

Figure 13:
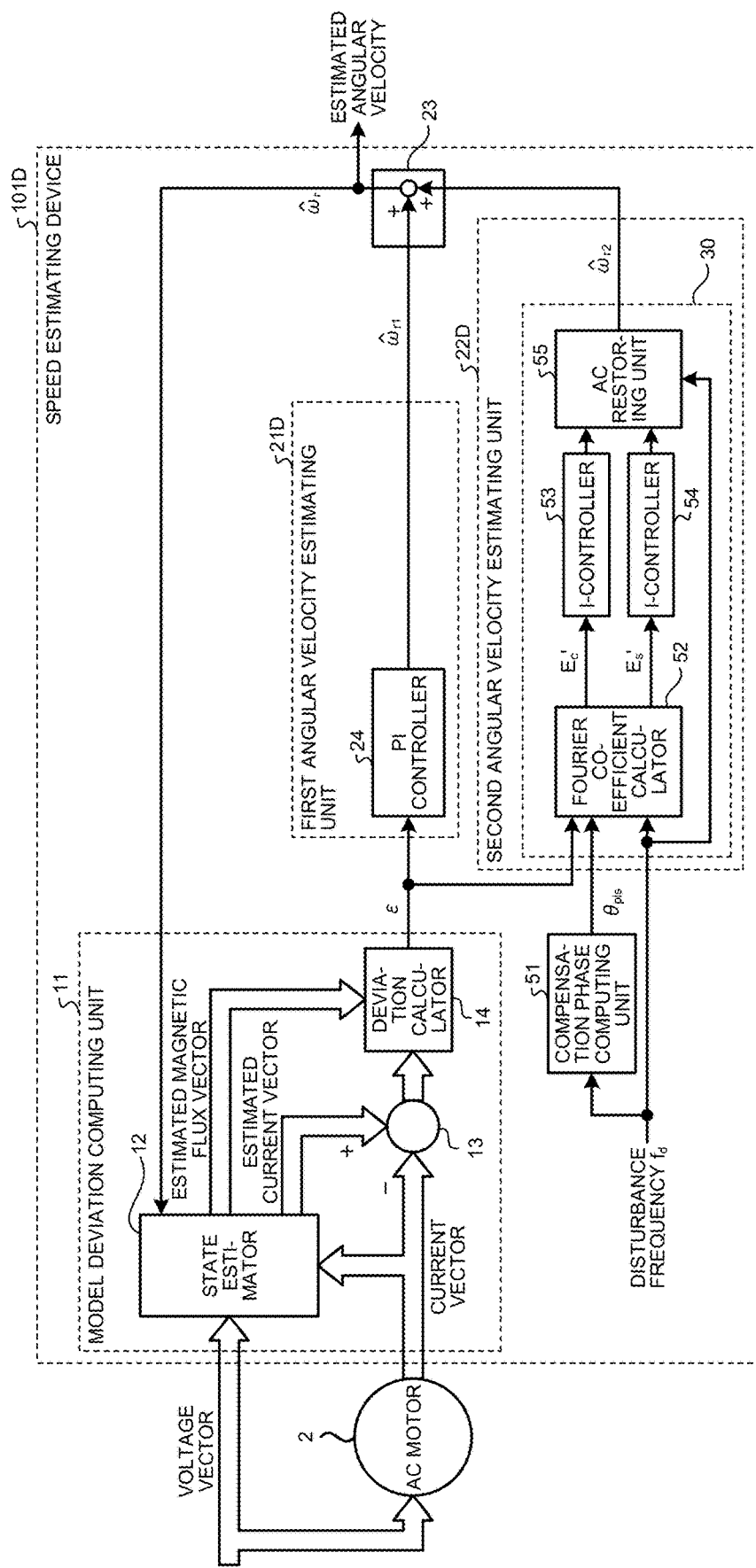
FIG. 13 is a block diagram illustrating a configuration of a speed estimating device according to a third embodiment.

FIG. 13 is a block diagram illustrating a configuration of a speed estimating device 101D according to a third embodiment. In FIG. 13, in the speed estimating device 101D according to the third embodiment, the first angular velocity estimating unit 21 and the second angular velocity estimating unit 22 in the configuration of the speed estimating device 101 according to the first embodiment illustrated in FIG. 7 are replaced with a first angular velocity estimating unit 21D and a second angular velocity estimating unit 22D, respectively. In the first angular velocity estimating unit 21D, the integrator 25 is omitted from the configuration of the first angular velocity estimating unit 21, and in the second angular velocity estimating unit 22D, the integrator 31 is omitted from the second angular velocity estimating unit 22. Note that the other configuration is the same as or equivalent to that in FIG. 7, and the same or equivalent components are denoted by the same reference symbols and redundant description thereof will be omitted.

A PI controller 24 included in the first angular velocity estimating unit 21D performs computation processing expressed by the above equation (5). In other words, the first angular velocity estimating unit 21D generates the first estimated angular velocity $\hat{\omega}_{r1}$ only in PI control without using an integrator, and outputs the first estimated angular velocity $\hat{\omega}_{r1}$ to the estimated angular velocity calculator 23. Similarly, a second angular acceleration estimating unit 30 included in the second angular velocity estimating unit 22D also generates the second estimated angular velocity $\hat{\omega}_{r2}$ without using an integrator, and outputs the second estimated angular velocity $\hat{\omega}_{r2}$ to the estimated angular velocity calculator 23. Subsequent operations are as described in the first embodiment.

Because the speed estimating device 101D according to the third embodiment includes the second angular velocity estimating unit 22D, the speed estimating device 101D can estimate high-frequency speed pulsation more accurately than the speed estimating devices of the first and second comparative examples. The reasons thereof are as described in the first embodiment.

The accuracy of speed estimation in the third embodiment, however, is lower than that in the first embodiment. In terms of the computation amount required for computation for estimation, however, the third embodiment is more advantageous because the computation of integration is omitted. Therefore, in a case where the computation performance of the processor 901 illustrated in FIG. 11 is low and the calculation amount is to be as small as possible, the configuration of the third embodiment is more preferable. Although details will be provided later, in a case where speed pulsation suppression control described in a fifth embodiment is performed, however, the configuration of the speed estimating device 101 according to the first embodiment is more preferable.

In addition, for an example similar to the third embodiment, a configuration may be realized in which the first angular velocity estimating unit 21D includes the integrator 25 and the second angular velocity estimating unit 22D does not include the integrator 31. Alternatively, another configuration may be realized in which the first angular velocity estimating unit 21D does not include the integrator 25 and the second angular velocity estimating unit 22D includes the integrator 31.

Fourth Embodiment

Figure 14:
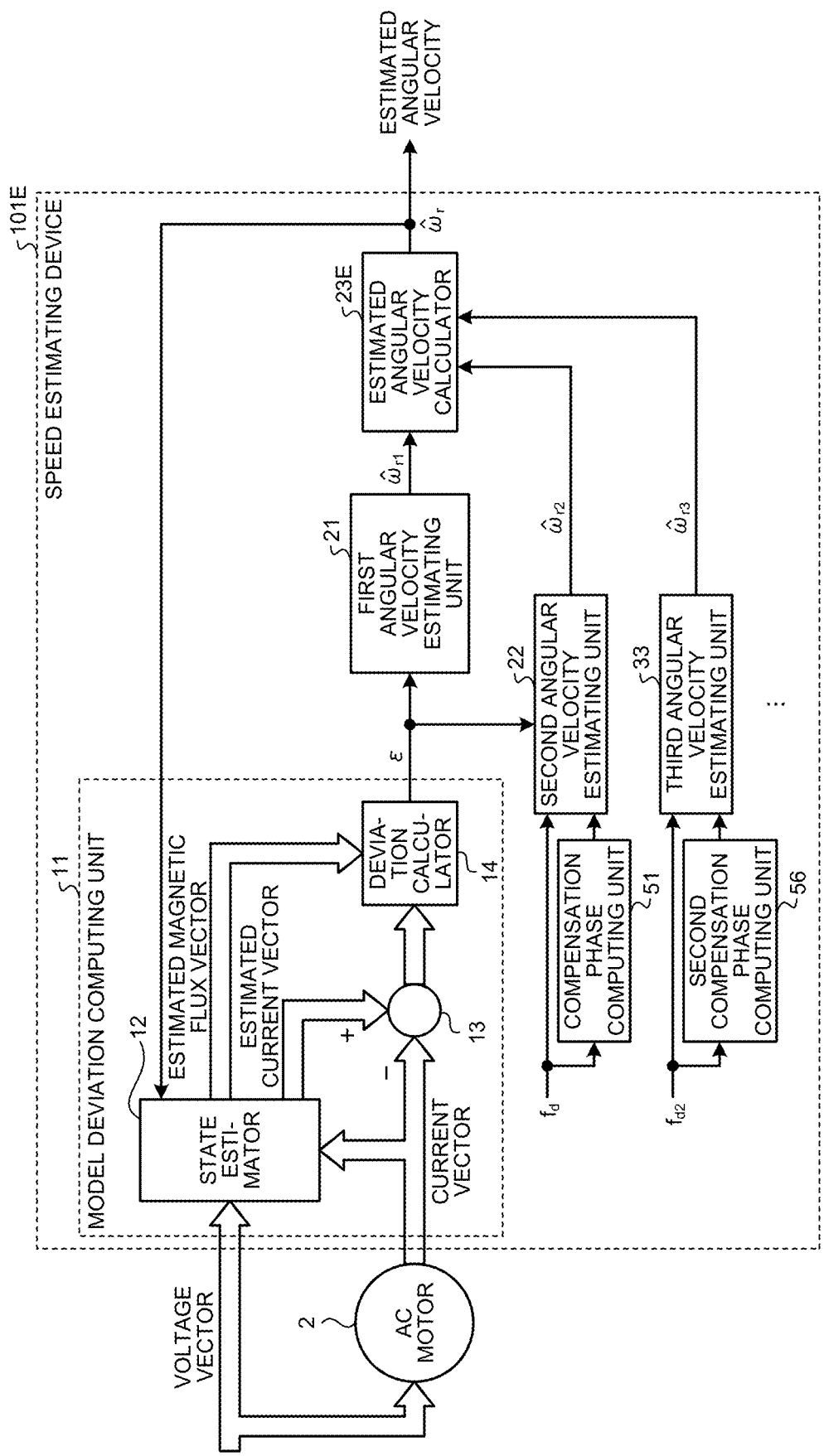
FIG. 14 is a block diagram illustrating a configuration of a speed estimating device according to a fourth embodiment.

FIG. 14 is a block diagram illustrating a configuration of a speed estimating device 101E according to a fourth embodiment. In FIG. 14, the speed estimating device 101E according to the fourth embodiment includes a second compensation phase computing unit 56 and a third angular velocity estimating unit 33 in addition to the configuration of the speed estimating device 101 according to the first embodiment illustrated in FIG. 1. In addition, the estimated angular velocity calculator 23 is replaced with an estimated angular velocity calculator 23E. In other words, two angular velocity estimating units are provided in the first to third embodiments, but the fourth embodiment is directed to a configuration having three angular velocity estimating units. Note that the other configuration is the same as or equivalent to that in FIG. 7, and the same or equivalent components are denoted by the same reference symbols and redundant description thereof will be omitted.

Typically, the characteristics of angular speed pulsation included in the rotational angular velocity of an AC motor vary depending on an application applied to the motor or on a load device connected to the AC motor. Now in a case where a connected load device has periodic torque fluctuation, a rotary compressor is considered by way of example.

Figure 15:
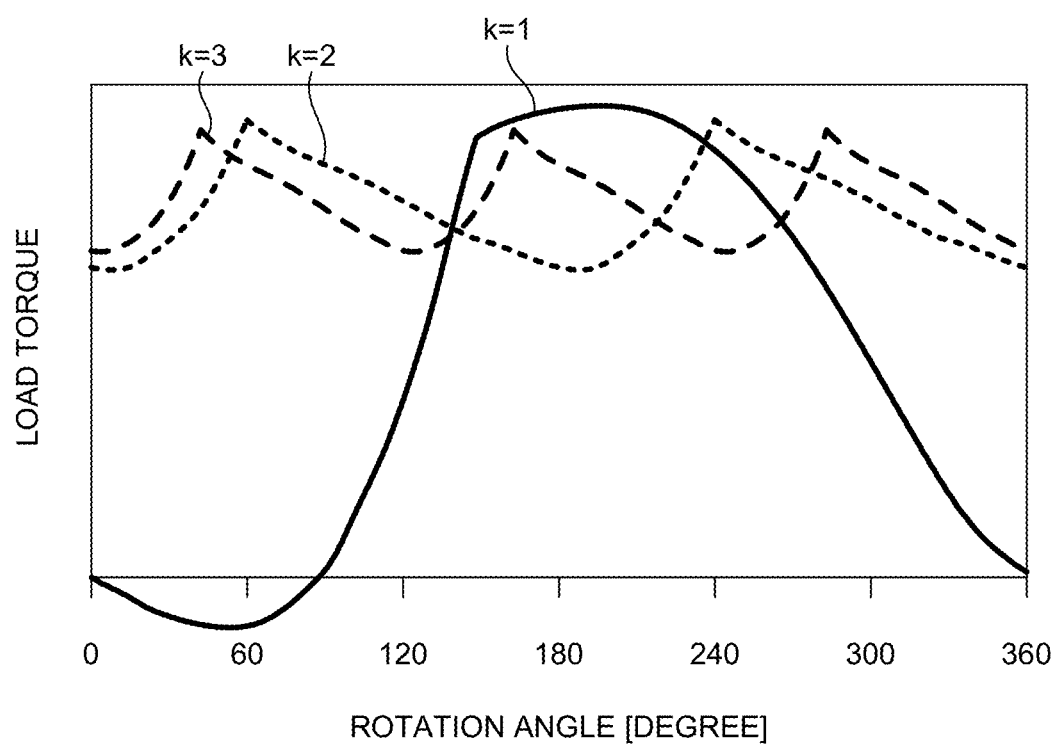
FIG. 15 is a graph illustrating an example of a waveform of a load torque of a rotary compressor.

FIG. 15 is a graph illustrating an example of a waveform of load torque of a rotary compressor. The horizontal axis represents rotation angle, and the vertical axis represents load torque. Herein, the number of compression chambers in the rotary compressor is represented by k. 0 to 360 degrees of the rotation angle corresponds to one cycle period of a mechanical angle, that is, a mechanical angle period.

First, in a case where only one compression chamber is present, that is, in a case of k=1, the load torque vibrates greatly with the mechanical angle period as illustrated by a solid curve in FIG. 15. Although second and third harmonics are also included in the load torque waveform, the first-order vibration is the greatest. Therefore, in a case where a configuration in the first to third embodiments is applied, the largest first-order angular speed pulsation can be estimated with high accuracy by setting the disturbance frequency $f_d$ used for computation of the second estimated angular velocity $\hat{\omega}_{r2}$ to a primary frequency of the mechanical angular frequency.

In the fourth embodiment, a plurality of angular velocity estimating units are provided in parallel. Therefore, speed pulsation due to second-order and third-order torque fluctuations included in the load torque characteristics can also be estimated with high accuracy. In the example of FIG. 14, the frequency of speed pulsation to be estimated is used as a second disturbance frequency $f_{d2}$, which is estimated by the third angular velocity estimating unit 33 and outputted as a third estimated angular velocity $\hat{\omega}_{r3}$.

The same is applicable to a case where the number of compression chambers is two or three, that is, a case of k=2 or k=3. As the number of compression chambers is larger, the structure is more complicated and the cost is higher, but the waveform has smaller pulsation as illustrated in FIG. 15. Specifically, in the case of k=2, a second harmonic component of the mechanical angular frequency is large, and in the case of k=3, a third harmonic component is large.

In the case of k=2, for example, the second-order vibration in the mechanical angle period is dominant as illustrated in FIG. 15. Therefore, the disturbance frequency $f_d$ inputted to the second angular velocity estimating unit 22 is set as a secondary frequency of the mechanical angular frequency. Then, if higher-order frequencies than the secondary frequency are to be further estimated, these higher-order frequencies may be inputted as the second disturbance frequency $f_{d2}$ to the third angular velocity estimating unit 33.

In the case of k=3, for example, the third-order vibration in the mechanical angle period is dominant as illustrated in FIG. 15. Therefore, the disturbance frequency $f_d$ inputted to the second angular velocity estimating unit 22 is set as a tertiary frequency of the mechanical angular frequency. Then, if higher-order frequencies than the tertiary frequency are to be further estimated, these higher-order frequencies may be inputted as the second disturbance frequency $f_{d2}$ to the third angular velocity estimating unit 33.

It is noted that a plurality of angular velocity estimating units are provided in parallel and each of the angular velocity estimating units performs phase compensation in the fourth embodiment, but the present invention is not necessarily limited by this example. Phase compensation may be performed by at least one of the angular velocity estimating units, and this single compensation is sufficient for producing the effects peculiar to phase compensation described above.

Fifth Embodiment

Figure 16:
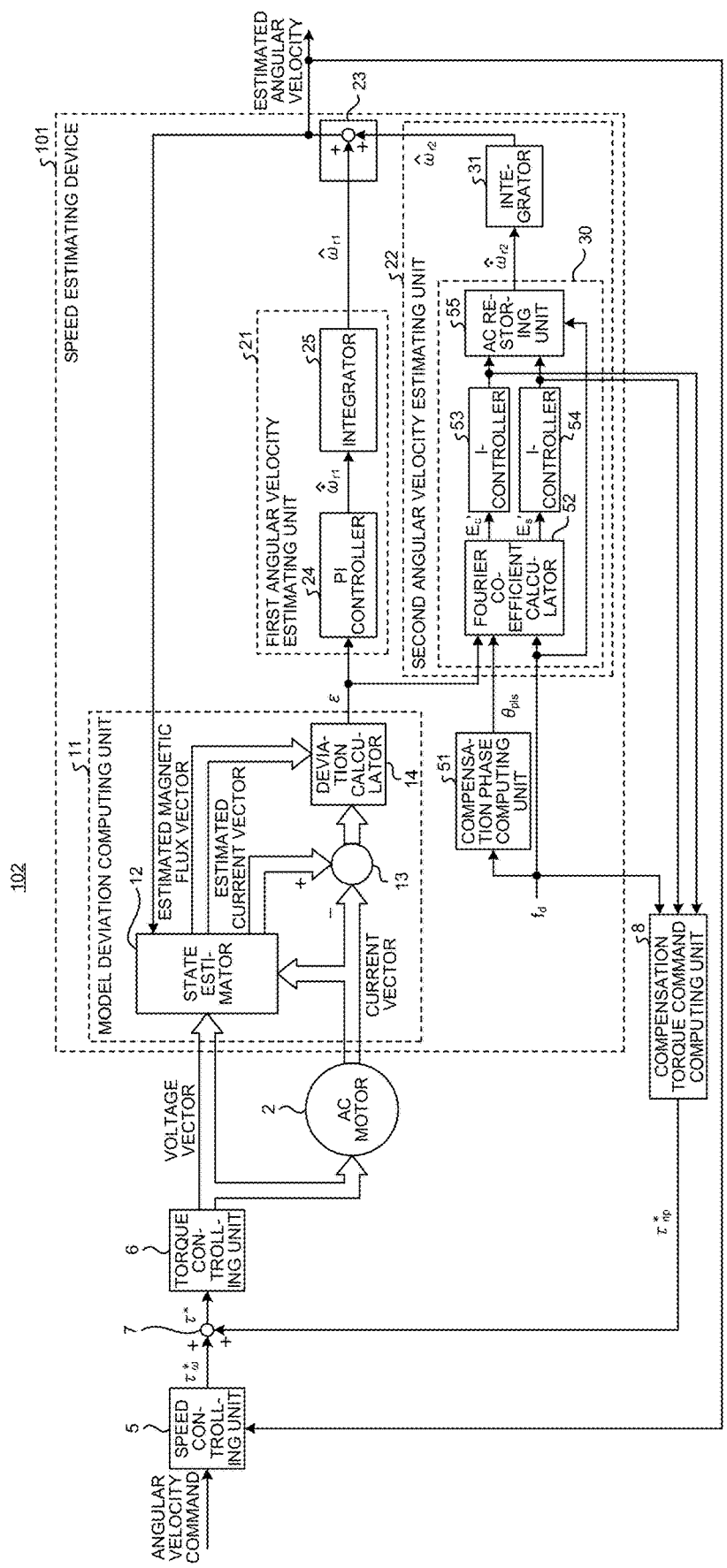
FIG. 16 is a block diagram illustrating a configuration of a driving device for an AC motor according to a fifth embodiment.

FIG. 16 is a block diagram illustrating a configuration of a driving device 102 for an AC motor according to a fifth embodiment. The driving device 102 according to the fifth embodiment is a driving device configured to control the AC motor 2 with use of the speed estimating device 101, 101C, 101D, or 101E described in the first to fourth embodiments.

FIG. 16 illustrates a configuration to which the speed estimating device 101 according to the first embodiment is applied, as an example.

As illustrated in FIG. 16, the driving device 102 according to the fifth embodiment includes a speed controlling unit 5, an adder 7, a torque controlling unit 6, a compensation torque command computing unit 8 that is a compensation amount computing unit, and the speed estimating device 101. The compensation torque command computing unit 8 operates as a "compensation command computing unit".

First, the operation of the compensation torque command computing unit 8 will be explained. Note that by way of example, the following description is given for a configuration in which the compensation torque command computing unit 8 performs computation on the basis of information on angular acceleration computed by the second angular velocity estimating unit 22.

The compensation torque command computing unit 8 computes a compensation torque command $\tau^*_{rip}$ by using the following equations (22) to (24).

[Formula 22]

$$T_c = \left(\frac{K_{si\_rip}}{s}\right) \cdot (0 - \hat{\Omega}_c) \quad (22)$$

[Formula 23]

$$T_s = \left(\frac{K_{si\_rip}}{s}\right) \cdot (0 - \hat{\Omega}_s) \quad (23)$$

[Formula 24]

$$\tau^*_{rip} = T_s \sin(2\pi f_d t) + T_c \cos(2\pi f_d t) \quad (24)$$

In the equations (22) and (23), $K_{si\_rip}$ represents an integral gain of the compensation torque command computing unit 8. In addition, $T_c$ in the above equation (22) represents the amplitude of the compensation torque command $\tau^*_{rip}$ corresponding to the cosine component of the pulsation of the angular acceleration, and $T_s$ in the equation (23) represents the amplitude of the compensation torque command $\tau^*_{rip}$ corresponding to the sine component of the pulsation of the angular acceleration. As expressed by the above equations (22) and (23), a compensation torque command $\tau^*_{rip}$ is computed such that each of the cosine component of the pulsation of the angular acceleration and the sine component of the pulsation of the angular acceleration is zero. Control using this compensation torque command $\tau^*_{rip}$ can reduce the pulsation of the angular acceleration, and as a result, can reduce the speed pulsation as well.

The reason why integral control is used in the equations (22) and (23) is that the characteristic of the controlled object is a proportional characteristic when the compensation torque command $\tau^*_{rip}$ is obtained on the basis of the angular acceleration. In addition, it is because an ideal closed loop characteristic can be achieved by causing a controller to have an integral characteristic and performing feedback control. In the case of a configuration like the second angular velocity estimating unit 22 in which the compensation phase $\theta_{pls}$ determined by the compensation phase computing unit 51 is used, compensation can be made for the phase of the equation (24) on the basis of the compensation phase $\theta_{pls}$. Alternatively, when the compensation phase $\theta_{pls}$ is a compensation phase based on the disturbance frequency $f_d$, the computation may be performed using an equation other than the equation (24). Although the concerned explanation is not provided because the principle thereof is the same, the computation of the compensation torque command described above can be similarly performed with use of the second estimated angular velocity $\hat{\omega}_{r2}$ computed by the second angular velocity estimating unit 22.

Next, the operations of the speed controlling unit 5, the torque controlling unit 6, and the adder 7 will be explained.

The speed controlling unit 5 computes a basic torque command $\tau^*_\omega$ on the basis of an angular velocity command and the estimated angular velocity $\hat{\omega}_r$. Speed control performed by a typical PI controller can be applied to the computation of the basic torque command $\tau^*_\omega$.

The adder 7 adds the compensation torque command $\tau^*_{rip}$ to the basic torque command $\tau^*_\omega$ to compute a torque command $\tau^*$ according to the following equation (25).

[Formula 25]

$$\tau^* = \tau^*_\omega + \tau^*_{rip} \quad (25)$$

The torque controlling unit 6 includes the voltage applying unit 3 illustrated in FIG. 11. The torque controlling unit 6 determines a voltage vector to be applied to the AC motor 2 on the basis of the torque command $\tau^*$. The voltage vector may be of a type computed through electric-current control such as PI control on the basis of a current command value computed on the basis of the torque command $\tau^*$. Alternatively, an appropriate voltage command value depending on the torque command $\tau^*$ may be stored in the memory 902 and obtained directly on the basis of the torque command $\tau^*$.

The driving device 102 according to the fifth embodiment can obtain a compensation torque command to reduce the speed pulsation on the basis of information on the angular speed pulsation obtained by the speed estimating device 101. This produces an effect of reducing uneven rotation of the AC motor 2.

While FIG. 16 illustrates a configuration including the compensation torque command computing unit 8 that computes the compensation torque command $\tau^*_{rip}$, the present invention is not limited to this configuration. Another configuration may be realized in which a compensation current command computing unit that computes a compensation current command is employed instead of the compensation torque command computing unit 8. In the case of this configuration, an adder and a current controlling unit are provided on a subsequent stage of the torque controlling unit 6. The adder adds a basic current command generated by the torque controlling unit 6 to the compensation current command computed by the compensation current command computing unit to generate a current command. The current controlling unit determines a voltage vector to be applied to the AC motor 2 on the basis of the current command outputted from the adder. Subsequent operations are as described above.

Sixth Embodiment

Figure 17:
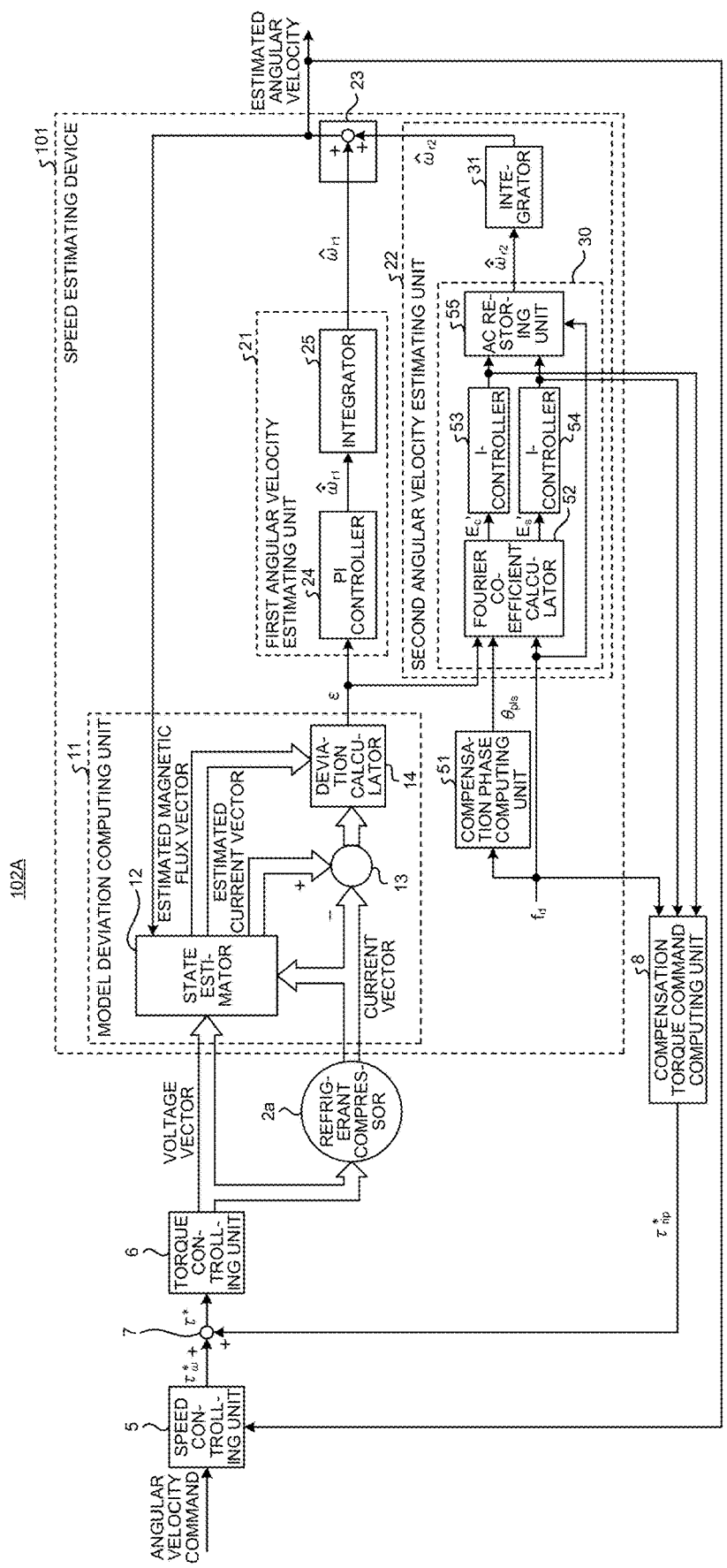
FIG. 17 is a block diagram illustrating a configuration of a driving device for an AC motor according to a sixth embodiment.

FIG. 17 is a block diagram illustrating a configuration of a driving device 102A for an AC motor according to a sixth embodiment. In FIG. 17, the AC motor 2 illustrated in FIG. 16 is replaced with a refrigerant compressor 2a including the AC motor 2. The driving device 102A according to the sixth embodiment is configured using the speed estimating device 101 according to the first embodiment in order to reduce the speed pulsation of the refrigerant compressor 2a. FIG. 17 illustrates a configuration to which the speed estimating device 101 according to the first embodiment is applied, but the present invention is not limited to this example. The driving device 102A may be configured using any of the speed estimating devices 101C, 101D, and 101E described in the second to fourth embodiments. Note that the configurations and the functions of the speed estimating devices 101, 101C, 101D, and 101E are as described above, and so description thereof is omitted in this part.

Figure 18:
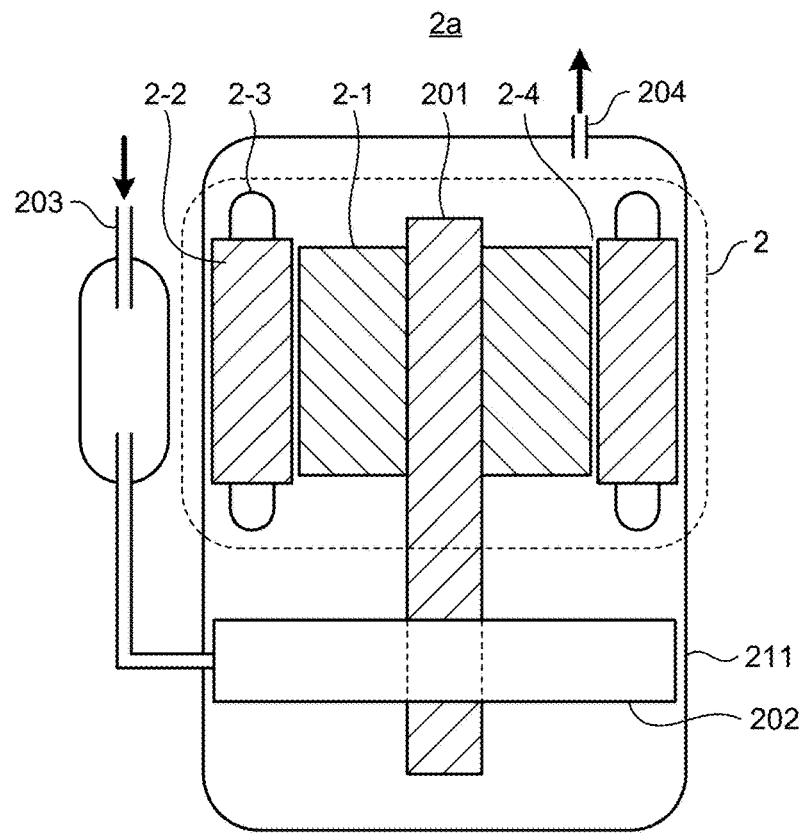
FIG. 18 is a cross-sectional view illustrating an outline structure inside a refrigerant compressor illustrated as a driven object in FIG. 17.
Figure 19:
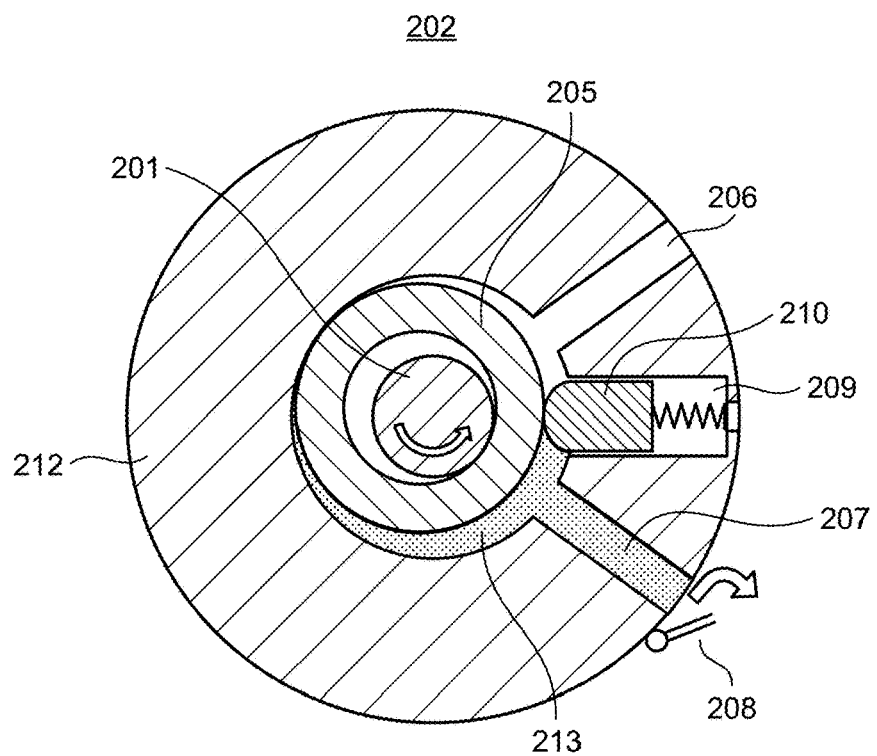
FIG. 19 is a cross-sectional view illustrating a structure inside a compression chamber of the refrigerant compressor illustrated in FIG. 18.

Next, the structure of the refrigerant compressor 2a and a load torque in the refrigerant compressor 2a will be described in detail with reference to FIGS. 18 and 19. FIG. 18 is a cross-sectional view illustrating an outline structure of the interior of the refrigerant compressor 2a illustrated as a driven object in FIG. 17. In addition, FIG. 19 is a cross-sectional view illustrating a structure of the interior of a compressing unit 202 of the refrigerant compressor 2a illustrated in FIG. 18. Note that a refrigerant compressor called a rolling piston type rotary compressor will be described herein, but the present invention is not limited to this example. The refrigerant compressor may be another type of compressor such as a scroll compressor.

The refrigerant compressor 2a includes an airtight container 211, the AC motor 2 housed in the airtight container 211, a shaft 201 having one end passing through a rotor 2-1 constituting the AC motor 2, the compressing unit 202 through which the other end of the shaft 201 passes and which is fixed to the inside of the airtight container 211, an inlet pipe 203 provided to the airtight container 211, and an outlet pipe 204 provided to the airtight container 211.

A stator 2-2 of the AC motor 2 is attached to and retained by the airtight container 211 by shrinkage fitting, freeze fitting, or welding. Electric power is supplied to a coil 2-3 on the stator 2-2 via an electric wire, which is not illustrated. The rotor 2-1 is disposed inside the stator 2-2 with a gap 2-4 therebetween, and rotatably held by a bearing, which is not illustrated, via the shaft 201 situated at the center of the rotor 2-1.

In the refrigerant compressor 2a having the configuration as described above, upon driving of the AC motor 2, refrigerant sucked into the compressing unit 202 via the inlet pipe 203 is compressed, and the compressed refrigerant is discharged out from the outlet pipe 204. The refrigerant compressor 2a often has a structure in which the AC motor 2 is immersed in the refrigerant, and it is difficult to attach a position sensor to the AC motor 2 because of wide swing in temperature thereon. For this reason, in the refrigerant compressor 200, the AC motor 2 has to be driven in a position sensorless driving manner.

As illustrated in FIG. 19, the compressing unit 202 includes an annular cylinder 212, a piston 205 formed rotatably and integrally with the shaft 201 and located inside the cylinder 212, and a compression chamber 213 provided in an inner circumferential part of the cylinder 212.

The cylinder 212 includes an inlet 206 communicating with the inlet pipe 203 illustrated in FIG. 18, and an outlet 207 through which the compressed refrigerant is discharged outward. The inlet 206 and the outlet 207 communicate with the compression chamber 213. The cylinder 212 includes a vane 210 that partitions the compression chamber 213 into a low-pressure sub-chamber communicating with the inlet pipe 203 and a high-pressure sub-chamber communicating with the outlet 207, and a spring 209 set to energize the vane 210.

The shaft 201 connects the AC motor 2 and the piston 205 with each other. The piston 205 is eccentric, so that the capacities on the suction side and the discharge side change depending on the rotation angle. The refrigerant sucked through the inlet 206 is compressed by the piston 205. When the pressure in the compression chamber 213 increases, a discharge valve 208 opens, and the refrigerant is discharged through the outlet 207. When the refrigerant is discharged, refrigerant flows into the suction side at the same time. As the rotation of the AC motor 2 is continued, the refrigerant is discharged once per revolution in the mechanical angle of the piston 205.

The load torque pulsation of the refrigerant compressor 2a corresponds to periodic disturbance for the AC motor 2, and so becomes a factor for speed pulsation. It is generally known that greater speed pulsation in the refrigerant compressor 2a results in greater noise and vibration.

There is a significant point that the frequencies of the load torque pulsation and the speed pulsation are determined by the structure of the refrigerant compressor 2a, and so are known in advance. In the refrigerant compressor 2a according to the sixth embodiment, the control system illustrated in FIG. 17 is built under favor of that point. The refrigerant compressor 2a estimates a specific frequency component of the speed pulsation with high accuracy in the second angular velocity estimating unit 22, and computes such a compensation torque command $\tau^*_{rip}$ that suppresses the pulsation in the compensation torque command computing unit 8. As a result, the speed pulsation can be reduced without preconditioning. Because preconditioning becomes unnecessary, the cost for conditioning prior to shipment can be significantly reduced, then resulting in great usefulness.

Seventh Embodiment

Figure 20:
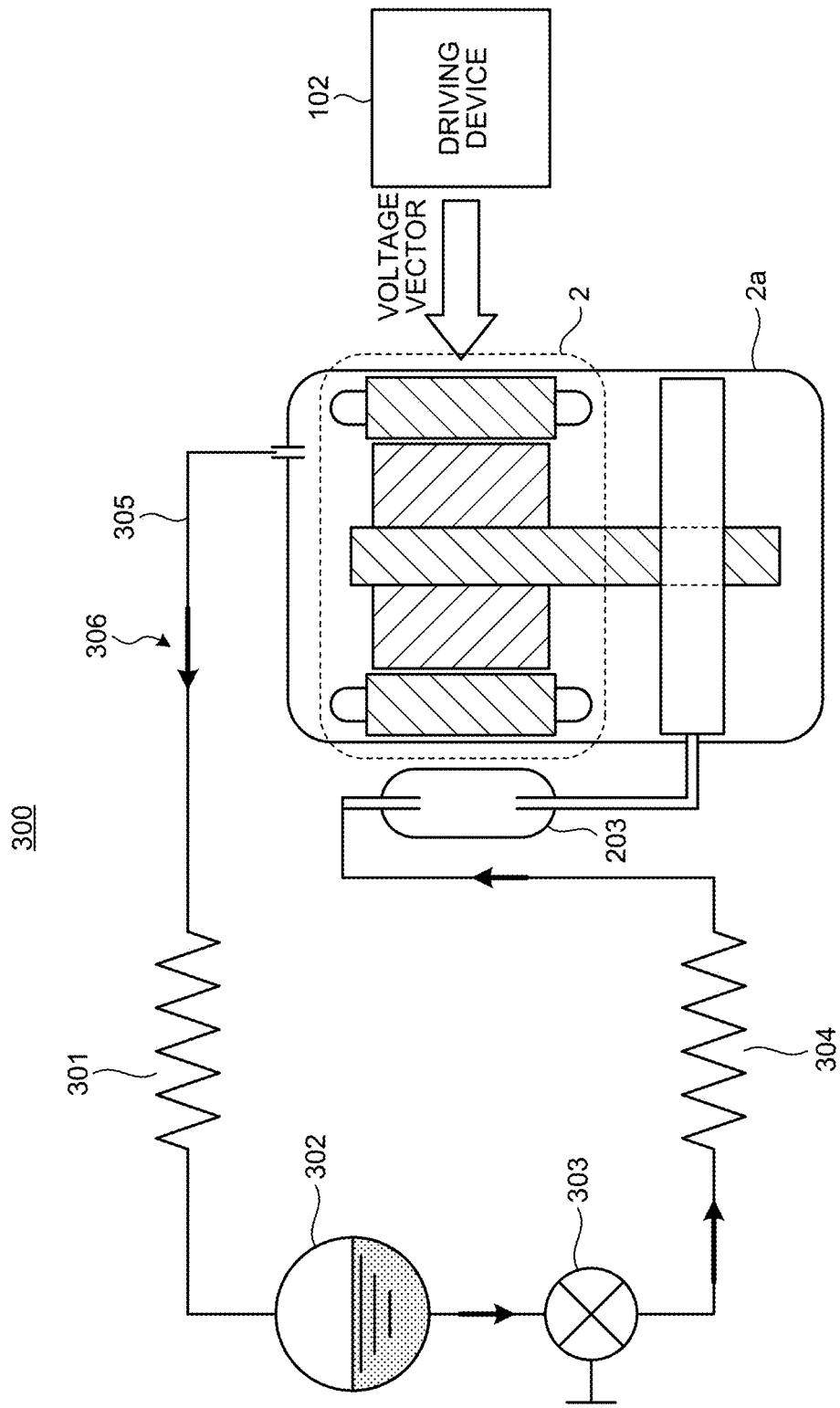
FIG. 20 is a diagram illustrating a configuration of a refrigeration cycle apparatus according to a seventh embodiment.

FIG. 20 is a diagram illustrating a configuration of a refrigeration cycle apparatus according to a seventh embodiment. The refrigeration cycle apparatus 300 illustrated in FIG. 20 includes the driving device 102 for an AC motor, the refrigerant compressor 2a, a condenser 301 connected with the refrigerant compressor 2a via piping 305, a liquid receiver 302 connected with the condenser 301 via the piping 305, an expansion valve 303 connected with the receiver 302 via the piping 305, and an evaporator 304 connected with the expansion valve 303 via the piping 305. The evaporator 304 is connected to the inlet pipe 203.

By the refrigerant compressor 2a, the condenser 301, the liquid receiver 302, the expansion valve 303, the evaporator 304, and the inlet pipe 203 being connected by the piping 305, the refrigerant compressor 2a, the condenser 301, the liquid receiver 302, the expansion valve 303, the evaporator 304, and the inlet pipe 203 constitute a refrigeration cycle circuit 306 in which the refrigerant circulates. In the refrigeration cycle circuit 306, processes of evaporating, compressing, condensing, and expanding of the refrigerant are repeated, and heat is transferred while the refrigerant repeatedly changes from liquid to gas and from gas to liquid.

The functions of the devices constituting the refrigeration cycle apparatus 300 will be explained. The evaporator 304 evaporates refrigerant liquid in a low-pressure state, draws heat from the surrounding, and thus has a cooling effect. The refrigerant compressor 2a compresses refrigerant gas into high-pressure gas in order to condense the refrigerant. The refrigerant compressor 2a is driven by the driving device 102A according to the sixth embodiment. The condenser 301 releases the heat to condense the high-pressure refrigerant gas into refrigerant liquid. The expansion valve 303 subjects the refrigerant liquid to throttle expansion into low-pressure liquid in order to evaporate the refrigerant. The liquid receiver 302 is provided for adjusting the amount of refrigerant to be circulated, and may be omitted in a case of a compact apparatus.

Typically, improvement in quietness and reduction in cost are required for a refrigeration cycle apparatus. In a household refrigeration cycle apparatus, there are particularly high demands for lower cost, and so a single rotary compressor is often used. A single rotary compressor is a rotary compressor described in FIGS. 18 and 19, which is a compressor of a type including only one compression chamber 213. A rotary compressor involves significantly great load torque pulsation, and thus tends to cause large vibration and loud noise. On the other hand, in a feedforward control system in the conventional art, complicated control adjustment has needed for reducing vibration and noise.

The refrigeration cycle apparatus 300 according to the seventh embodiment performs feedback control so that the driving device 102A automatically makes the speed pulsation be zero. As a result, the cost for adjustment before shipping can be significantly reduced. In addition, according to the seventh embodiment, speed pulsation is reduced by feedback control, thereby enabling flexible response to variations in manufacture, fluctuation in motor constant, and changes in compressor load condition. Consequently, the refrigeration cycle apparatus 300 that has higher environment resistance can be achieved.

The configurations presented in the above embodiments are examples of contents of the present invention, and can each be combined with other publicly known techniques and partly omitted and/or modified without departing from the scope of the present invention.

REFERENCE SIGNS LIST

2 AC motor; 2a refrigerant compressor; 3 voltage applying unit; 4 current detecting unit; 5 speed controlling unit; 6 torque controlling unit; 7 adder; 8 compensation torque command computing unit; 11 model deviation computing unit; 12 state estimator; 13 subtractor; 14 deviation calculator; 21 first angular velocity estimating unit; 22, 22B, 22C, 22D second angular velocity estimating unit; 23 estimated angular velocity calculator; 24, 27, 28 PI controller; 25, 31, 32 integrator; 26, 52 Fourier coefficient calculator; 29, 55 AC restoring unit; 30, 30B, 30C second angular acceleration estimating unit; 33 third angular velocity estimating unit; 51 compensation phase computing unit; 53, 54 I-controller; 56 second compensation phase computing unit; 101, 101-1, 101A, 101B, 101C, 101D, 101E speed estimating device; 102 driving device; 200 refrigerant compressor; 201 shaft; 202 compressing unit; 203 inlet pipe; 204 outlet pipe; 205 piston; 206 inlet; 207 outlet; 208 discharge valve; 209 spring; 210 vane; 211 airtight container; 212 cylinder; 213 compression chamber; 300 refrigeration cycle apparatus; 301 condenser; 302 liquid receiver; 303 expansion valve; 304 evaporator; 305 piping; 306 refrigeration cycle circuit; 901 processor; 902 memory.

The invention claimed is:

1. A speed estimating device for an AC motor, the speed estimating device comprising:
   model deviation computing circuitry to compute a model deviation on the basis of a voltage, a current, and an estimated angular velocity of the AC motor;
   first angular velocity estimating circuitry to compute a first estimated angular velocity on the basis of the model deviation;
   second angular velocity estimating circuitry to compute a second estimated angular velocity on the basis of the model deviation, the second estimated angular velocity differing from the first estimated angular velocity in frequency;
   compensation phase computing circuitry to compute a compensation phase on the basis of a disturbance frequency; and
   estimated angular velocity circuitry to compute an estimated angular velocity of the AC motor on the basis of the first and second estimated angular velocities, wherein
   either one of the first and second estimated angular velocities is computed on the basis of the compensation phase.

2. The speed estimating device for an AC motor according to claim 1, wherein
   the first estimated angular velocity has a frequency lower than a frequency of the second estimated angular velocity,
   the first angular velocity estimating circuitry computes the first estimated angular velocity on the basis of the model deviation, and
   the second angular velocity estimating circuitry computes the second estimated angular velocity on the basis of the model deviation, the compensation phase, and disturbance frequency.

3. The speed estimating device for an AC motor according to claim 2, wherein
   the compensation phase computing circuitry computes the compensation phase in view of a phase characteristic of the first angular velocity estimating circuitry.

4. The speed estimating device for an AC motor according to claim 1, wherein
   the second angular velocity estimating circuitry includes:
   a specific frequency extractor to extract a specific frequency component of the model deviation on the basis of the disturbance frequency and the compensation phase; and
   a specific-frequency angular velocity estimator to compute the second estimated angular velocity on the basis of the specific frequency component.

5. The speed estimating device for an AC motor according to claim 1, wherein
   the second angular velocity estimating circuitry includes:
   a specific frequency extractor to extract a specific frequency component of the model deviation on the basis of the disturbance frequency; and
   a specific-frequency angular velocity estimator to compute the second estimated angular velocity on the basis of the specific frequency component and the compensation phase.

6. The speed estimating device for an AC motor according to claim 1, wherein
   the first angular velocity estimating circuitry includes:
   a first angular acceleration estimator to compute a first estimated angular acceleration from the model deviation; and
   a first angular velocity calculator to compute the first estimated angular velocity from the first estimated angular acceleration, and
   the second angular velocity estimating circuitry includes:
   a specific frequency extractor to extract a specific frequency component of the model deviation on the basis of the disturbance frequency and the compensation phase;
   a specific-frequency angular acceleration estimator to compute a second estimated angular acceleration on the basis of a specific frequency component of the model deviation; and a second angular velocity calculator to compute the second estimated angular velocity from the second estimated angular acceleration.

7. The speed estimating device for an AC motor according to claim 1, comprising:
at least one other second angular velocity estimating circuitry configured similarly to the second angular velocity estimating circuitry, wherein
at least one of the second angular velocity estimating circuitry computes the second estimated angular velocity on the basis of the compensation phase.

8. A driving device for an AC motor, the driving device comprising:
the speed estimating device for an AC motor according to claim 1, wherein
the driving device determines a voltage to be applied to the AC motor on the basis of a current flowing in the AC motor and the estimated angular velocity computed by the speed estimating device.

9. The driving device for an AC motor according to claim 8, further comprising:
compensation command computing circuitry to compute a compensation current command or a compensation torque command on the basis of an angular velocity or an angular acceleration computed by the second angular velocity estimating circuitry.

10. A refrigerant compressor comprising:
the driving device for an AC motor according to claim 8;
an AC motor to which a voltage is applied by the driving device; and
a compressor in which refrigerant is compressed by the AC motor.

11. A refrigeration cycle apparatus comprising the refrigerant compressor according to claim 10.

* * * * *

UNITED STATES PATENT AND TRADEMARK OFFICE
CERTIFICATE OF CORRECTION

PATENT NO.        : 11,632,067 B2                                    Page 1 of 1
APPLICATION NO.   : 17/429363
DATED             : April 18, 2023
INVENTOR(S)       : Yuriko Takeda et al.

It is certified that error appears in the above-identified patent and that said Letters Patent is hereby corrected as shown below:

In the Drawings

Sheet 8, Fig. 10 should appear as shown below:

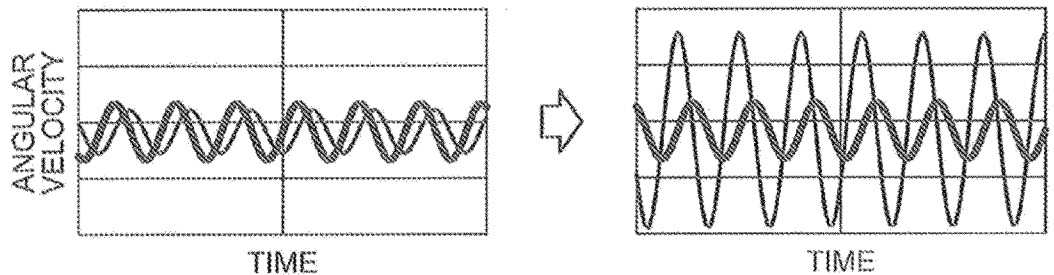

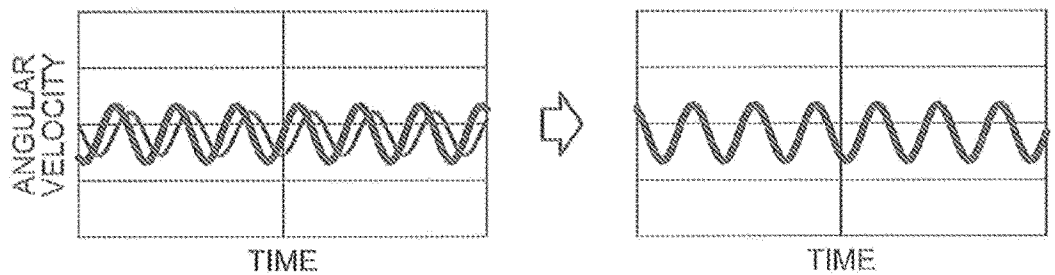

Signed and Sealed this
Twenty-seventh Day of June, 2023

Katherine Kelly Vidal
*Director of the United States Patent and Trademark Office*